US012677298B2

(12) United States Patent
Van Phan et al.

(10) Patent No.: US 12,677,298 B2
(45) Date of Patent: Jul. 7, 2026

(54) APPARATUS, METHOD, AND COMPUTER PROGRAM

(71) Applicant: Nokia Technologies Oy, Espoo (FI)

(72) Inventors: Vinh Van Phan, Oulu (FI); Ling Yu, Kauniainen (FI); Faranaz Sabouri-Sichani, Aalborg (DK); Stepan Kucera, Munich (DE); Berthold Panzner, Holzkirchen (DE); Ravi Prasad R K, Karnataka (IN); György Tamás Wolfner, Budapest (HU); Hannu Petri Hietalahti, Kiviniemi (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 328 days.

(21) Appl. No.: 18/371,653

(22) Filed: Sep. 22, 2023

(65) Prior Publication Data

US 2024/0114528 A1 Apr. 4, 2024

(30) Foreign Application Priority Data

Sep. 23, 2022 (EP) ..................................... 22197549

(51) Int. Cl.
 *H04W 72/25* (2023.01)
 *H04W 28/10* (2009.01)
(52) U.S. Cl.
 CPC ........... *H04W 72/25* (2023.01); *H04W 28/10* (2013.01)

(58) Field of Classification Search
 CPC .............................. H04W 72/25; H04W 28/10
 See application file for complete search history.

(56) References Cited

U.S. PATENT DOCUMENTS

| | | | |
|---|---|---|---|
| 2021/0160957 A1 | 5/2021 | Wang et al. | |
| 2021/0410214 A1 | 12/2021 | Kuo | |
| 2022/0109970 A1 | 4/2022 | Jeong | |
| 2024/0015572 A1 * | 1/2024 | Wang | ................ H04W 28/0278 |
| 2024/0098733 A1 * | 3/2024 | Wang | .................... H04L 1/1887 |

FOREIGN PATENT DOCUMENTS

| | | | | |
|---|---|---|---|---|
| WO | WO-2017196611 A1 * | 11/2017 | ............ | H04W 88/04 |
| WO | WO 2022/032034 A1 | 2/2022 | | |
| WO | WO 2022/032506 A1 | 2/2022 | | |
| WO | WO 2022/155138 A1 | 7/2022 | | |

OTHER PUBLICATIONS

EESR (22197549) Mar. 6, 2023, 10 pgs.
Apple, 3GPP TSG-RAN WG2 Meeting #114-e, "[Pre115-e] [605] [Relay] Summary of AI 8.7.2.4 QoS" R2-2109018 retrieved from Internet Aug. 15, 2021, XP 052043068, 13 pgs.

(Continued)

*Primary Examiner* — Duc C Ho
(74) *Attorney, Agent, or Firm* — Lippes Mathias LLLP

(57) ABSTRACT

The disclosure relates to receiving sidelink control information sent from a relay user equipment and performing flow control for ingress data sent from an apparatus to the relay user equipment to be relayed to a destination user equipment paired with the apparatus based on the sidelink control information sent from the relay user equipment.

18 Claims, 9 Drawing Sheets

800 SRC UE may receive SCI sent from a relay UE

802 SRC UE may perform flow control for ingress data sent from the SRC UE to the relay UE to be relayed to a DST UE paired with the SRC UE based on the SCI sent from the relay UE

(56) References Cited

OTHER PUBLICATIONS

Samsung et al, 3GPP TSG-RAN WG2 #116-e, "QoS flow control for L2 U2N Relay", R2-2110451 retrieved from the Internet Oct. 22, 2021, XP 052066892, 2 pgs.

Samsung Electronics, 3GPP TSG-RAN Wg2 #115-e, "QoS management aspects for L2 U2N Relay", R2-2107712 retrieved from the Internet Aug. 6, 2021, XP 052034333, 3 pgs.

MediaTek Inc. 3GPP TSG-RAN WG2 Meeting #112 electronic, "[Post111-e][627][Relay] Remaining issues on L2 architecture" email discussion R2-200nnnn, 54 pages.

* cited by examiner

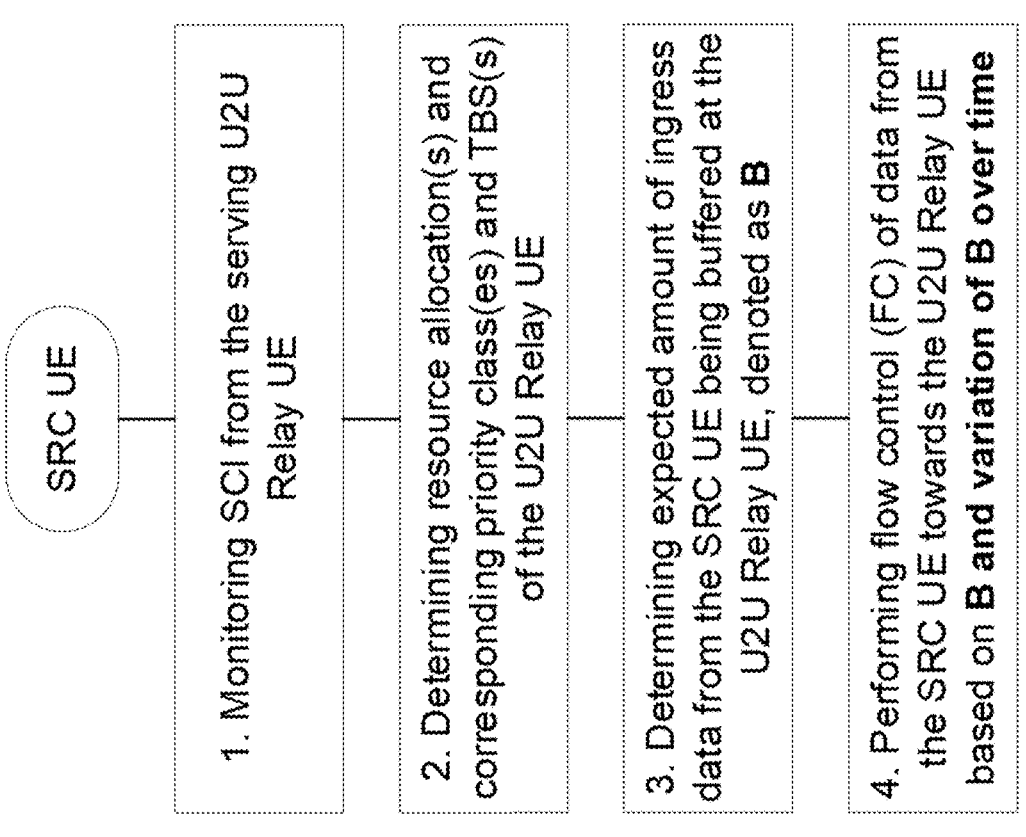

SRC UE

1. Monitoring SCI from the serving U2U Relay UE

2. Determining resource allocation(s) and corresponding priority class(es) and TBS(s) of the U2U Relay UE 3. Determining expected amount of ingress data from the SRC UE being buffered at the U2U Relay UE, denoted as B

4. Performing flow control (FC) of data from the SRC UE towards the U2U Relay UE based on B and variation of B over time

Fig. 6

800 SRC UE may receive SCI sent from a relay UE

802 SRC UE may perform flow control for ingress data sent from the SRC UE to the relay UE to be relayed to a DST UE paired with the SRC UE based on the SCI sent from the relay UE

APPARATUS, METHOD, AND COMPUTER PROGRAM

FIELD OF THE DISCLOSURE

The present disclosure relates to an apparatus, a method, and a computer program for managing sidelink communications in a communication system.

BACKGROUND

A communication system can be seen as a facility that enables communication sessions between two or more entities such as communication devices, base stations and/or other nodes by providing carriers between the various entities involved in the communications path.

The communication system may be a wireless communication system. Examples of wireless systems comprise public land mobile networks (PLMN) operating based on radio standards such as those provided by 3GPP, satellite based communication systems and different wireless local networks, for example wireless local area networks (WLAN). The wireless systems can typically be divided into cells, and are therefore often referred to as cellular systems.

The communication system and associated devices typically operate in accordance with a given standard or specification which sets out what the various entities associated with the system are permitted to do and how that should be achieved. Communication protocols and/or parameters which shall be used for the connection are also typically defined. Examples of standard are the so-called 5G standards.

SUMMARY

According to an aspect there is provided an apparatus comprising: means for receiving sidelink control information sent from a relay user equipment; and means for performing flow control for ingress data sent from the apparatus to the relay user equipment to be relayed to a destination user equipment paired with the apparatus based on the sidelink control information sent from the relay user equipment.

The sidelink control information sent from the relay user equipment may comprise at least one of: sidelink control information sent from the relay user equipment to the apparatus; sidelink control information sent from the relay user equipment to the destination user equipment paired with the apparatus; or sidelink control information sent from the relay user equipment to another destination user equipment not paired with the apparatus.

Performing flow control for the ingress data sent from the apparatus to the relay user equipment to be relayed to the destination user equipment paired with the apparatus may comprise: reducing some or all of the ingress data sent from the apparatus to the relay user equipment to be relayed to the destination user equipment paired with the apparatus; or stopping some or all of the ingress data from being sent from the apparatus to the relay user equipment to be relayed to the destination user equipment paired with the apparatus.

Performing flow control for the ingress data sent from the apparatus to the relay user equipment to be relayed to the destination user equipment paired with the apparatus may comprise: determining an amount of ingress data previously sent from the apparatus to the relay user equipment to be relayed to the destination user equipment paired with the apparatus and buffered by the relay user equipment based on the sidelink control information sent from the relay user equipment; and performing flow control for ingress data subsequently sent from the apparatus to the relay user equipment to be relayed to the destination user equipment paired with the apparatus based on the determining.

The apparatus may comprise: means for determining an amount of ingress data previously sent from the apparatus to the relay user equipment to be relayed to the destination user equipment paired with the apparatus and buffered by the relay user equipment based on the sidelink control information sent from the relay user equipment per a specific priority class or per all priority classes.

The apparatus may comprise: means for determining an amount of ingress data previously sent from the apparatus to the relay user equipment to be relayed to the destination user equipment paired with the apparatus and buffered by the relay user equipment further per a specific priority class based on a mapping between a priority class of ingress data previously sent from the apparatus to the relay user equipment to be relayed to the destination user equipment paired with the apparatus and a priority class of egress data sent from the relay user equipment and the destination user equipment paired with the apparatus.

The apparatus may comprise: means for determining that an amount B of ingress data of a specific priority class or of all priority classes previously sent from the apparatus to the relay user equipment to be relayed to the destination user equipment paired with the apparatus and buffered by the relay user equipment is greater than a first threshold B1 over a first period of time T1 based on sidelink control information sent from the relay user equipment; and means for reducing an amount of ingress data of a priority class lower than a determined priority class p subsequently sent from the apparatus to the relay user equipment to be relayed to the destination user equipment paired with the apparatus.

The determined priority class p is a specific priority class of the ingress data when the amount of ingress data of a specific priority class has been determined; or the determined priority class p may be a representative priority class derived from all priority classes when the amount of ingress data of all priority classes has been determined.

The apparatus may comprise: means for determining that the amount B of ingress data of a specific priority class or of all priority classes previously sent from the apparatus to the relay user equipment to be relayed to the destination user equipment paired with the apparatus and buffered by the relay user equipment is greater than a second threshold B2 over a second period of time T2 based on the sidelink control information sent from the relay user equipment, wherein the second threshold B2 is smaller than the first threshold B1, wherein the second period of time T2 is greater than the first period of time T1; and means for stopping ingress data of a priority class lower than the determined priority class p from being subsequently sent from the apparatus to the relay user equipment to be relayed to the destination user equipment paired with the apparatus and/or reducing an amount of ingress data of a priority class equal to the determined priority class p subsequently sent from the apparatus to the relay user equipment to be relayed to the destination user equipment paired with the apparatus.

The apparatus may comprise: means for determining that the amount B of ingress data of a specific priority class or of all priority classes previously sent from the apparatus to the relay user equipment to be relayed to the destination user equipment paired with the apparatus and buffered by the relay user equipment is greater than a third threshold B3 over a third period of time T3 based on the sidelink control information sent from the relay user equipment, wherein the third threshold B3 is smaller than the second threshold B2, wherein the third period of time T3 is greater than the second period of time T2; and means for sending user equipment assistance information to the relay user equipment, sending user equipment assistance information to the destination user equipment paired with the apparatus and/or sending a relay user equipment reselection request to the destination user equipment paired with the apparatus.

Multiple destination user equipment may be paired with the apparatus via the relay user equipment.

The apparatus may comprise: means for determining an amount of ingress data previously sent from the apparatus to the relay user equipment to be relayed to the destination user equipment paired with the apparatus and buffered by the relay user equipment per destination user equipment paired with the apparatus based on the sidelink control information sent from the relay user equipment.

Determining an amount of ingress data previously sent from the apparatus to the relay user equipment to be relayed to the destination user equipment paired with the apparatus and buffered by the relay user equipment based on the sidelink control information sent from the relay user equipment may comprise: determining an amount of ingress data previously sent from the apparatus to the relay user equipment to be relayed to the destination user equipment paired with the apparatus; determining an amount of egress data previously sent from the relay user equipment to the destination user equipment paired with the apparatus based on the sidelink control information sent from the relay user equipment; and determining a difference between the amount of ingress data previously sent from the apparatus to the relay user equipment to be relayed to the destination user equipment paired with the apparatus and the amount of egress data previously sent from the relay user equipment to the destination user equipment paired with the apparatus.

Determining the amount of ingress data previously sent from the apparatus to the relay user equipment to be relayed to the destination user equipment paired with the apparatus and buffered by the relay user equipment may be further based on at least one of: a load at the relay user equipment; a priority policy at the relay user equipment; or channel conditions between the relay user equipment and the destination user equipment paired with the apparatus.

According to an aspect there is provided an apparatus comprising at least one processor and at least one memory storing instructions that, when executed by the at least one processor, cause the apparatus at least to: receive sidelink control information sent from a relay user equipment; and perform flow control for ingress data sent from the apparatus to the relay user equipment to be relayed to a destination user equipment paired with the apparatus based on the sidelink control information sent from the relay user equipment.

The sidelink control information sent from the relay user equipment may comprise at least one of: sidelink control information sent from the relay user equipment to the apparatus; sidelink control information sent from the relay user equipment to the destination user equipment paired with the apparatus; or sidelink control information sent from the relay user equipment to another destination user equipment not paired with the apparatus.

Performing flow control for the ingress data sent from the apparatus to the relay user equipment to be relayed to the destination user equipment paired with the apparatus may comprise: reducing some or all of the ingress data sent from the apparatus to the relay user equipment to be relayed to the destination user equipment paired with the apparatus; or stopping some or all of the ingress data from being sent from the apparatus to the relay user equipment to be relayed to the destination user equipment paired with the apparatus.

Performing flow control for the ingress data sent from the apparatus to the relay user equipment to be relayed to the destination user equipment paired with the apparatus may comprise: determining an amount of ingress data previously sent from the apparatus to the relay user equipment to be relayed to the destination user equipment paired with the apparatus and buffered by the relay user equipment based on the sidelink control information sent from the relay user equipment; and performing flow control for ingress data subsequently sent from the apparatus to the relay user equipment to be relayed to the destination user equipment paired with the apparatus based on the determining.

The apparatus may comprise at least one processor and at least one memory storing instructions that, when executed by the at least one processor, cause the apparatus at least to: determine an amount of ingress data previously sent from the apparatus to the relay user equipment to be relayed to the destination user equipment paired with the apparatus and buffered by the relay user equipment based on the sidelink control information sent from the relay user equipment per a specific priority class or per all priority classes.

The apparatus may comprise at least one processor and at least one memory storing instructions that, when executed by the at least one processor, cause the apparatus at least to: determine an amount of ingress data previously sent from the apparatus to the relay user equipment to be relayed to the destination user equipment paired with the apparatus and buffered by the relay user equipment further per a specific priority class based on a mapping between a priority class of ingress data previously sent from the apparatus to the relay user equipment to be relayed to the destination user equipment paired with the apparatus and a priority class of egress data sent from the relay user equipment and the destination user equipment paired with the apparatus.

The apparatus may comprise at least one processor and at least one memory storing instructions that, when executed by the at least one processor, cause the apparatus at least to: determine that an amount B of ingress data of a specific priority class or of all priority classes previously sent from the apparatus to the relay user equipment to be relayed to the destination user equipment paired with the apparatus and buffered by the relay user equipment is greater than a first threshold B1 over a first period of time T1 based on sidelink control information sent from the relay user equipment; and reduce an amount of ingress data of a priority class lower than a determined priority class p subsequently sent from the apparatus to the relay user equipment to be relayed to the destination user equipment paired with the apparatus.

The determined priority class p is a specific priority class of the ingress data when the amount of ingress data of a specific priority class has been determined; or the determined priority class p may be a representative priority class derived from all priority classes when the amount of ingress data of all priority classes has been determined.

The apparatus may comprise at least one processor and at least one memory storing instructions that, when executed by the at least one processor, cause the apparatus at least to: determine that the amount B of ingress data of a specific priority class or of all priority classes previously sent from the apparatus to the relay user equipment to be relayed to the destination user equipment paired with the apparatus and buffered by the relay user equipment is greater than a second threshold B2 over a second period of time T2 based on the sidelink control information sent from the relay user equipment, wherein the second threshold B2 is smaller than the first threshold B1, wherein the second period of time T2 is greater than the first period of time T1; and stop ingress data of a priority class lower than the determined priority class p from being subsequently sent from the apparatus to the relay user equipment to be relayed to the destination user equipment paired with the apparatus and/or reducing an amount of ingress data of a priority class equal to the determined priority class p subsequently sent from the apparatus to the relay user equipment to be relayed to the destination user equipment paired with the apparatus.

The apparatus may comprise at least one processor and at least one memory storing instructions that, when executed by the at least one processor, cause the apparatus at least to: determine that the amount B of ingress data of a specific priority class or of all priority classes previously sent from the apparatus to the relay user equipment to be relayed to the destination user equipment paired with the apparatus and buffered by the relay user equipment is greater than a third threshold B3 over a third period of time T3 based on the sidelink control information sent from the relay user equipment, wherein the third threshold B3 is smaller than the second threshold B2, wherein the third period of time T3 is greater than the second period of time T2; and sending user equipment assistance information to the relay user equipment, sending user equipment assistance information to the destination user equipment paired with the apparatus and/or sending a relay user equipment reselection request to the destination user equipment paired with the apparatus.

Multiple destination user equipment may be paired with the apparatus via the relay user equipment.

The apparatus may comprise at least one processor and at least one memory storing instructions that, when executed by the at least one processor, cause the apparatus at least to: determine an amount of ingress data previously sent from the apparatus to the relay user equipment to be relayed to the destination user equipment paired with the apparatus and buffered by the relay user equipment per destination user equipment paired with the apparatus based on the sidelink control information sent from the relay user equipment.

Determining an amount of ingress data previously sent from the apparatus to the relay user equipment to be relayed to the destination user equipment paired with the apparatus and buffered by the relay user equipment based on the sidelink control information sent from the relay user equipment may comprise: determining an amount of ingress data previously sent from the apparatus to the relay user equipment to be relayed to the destination user equipment paired with the apparatus; determining an amount of egress data previously sent from the relay user equipment to the destination user equipment paired with the apparatus based on the sidelink control information sent from the relay user equipment; and determining a difference between the amount of ingress data previously sent from the apparatus to the relay user equipment to be relayed to the destination user equipment paired with the apparatus and the amount of egress data previously sent from the relay user equipment to the destination user equipment paired with the apparatus.

Determining the amount of ingress data previously sent from the apparatus to the relay user equipment to be relayed to the destination user equipment paired with the apparatus and buffered by the relay user equipment may be further based on at least one of: a load at the relay user equipment; a priority policy at the relay user equipment; or channel conditions between the relay user equipment and the destination user equipment paired with the apparatus.

According to an aspect there is provided an apparatus comprising circuitry configured to: receive sidelink control information sent from a relay user equipment; and perform flow control for ingress data sent from the apparatus to the relay user equipment to be relayed to a destination user equipment paired with the apparatus based on the sidelink control information sent from the relay user equipment.

According to an aspect there is provided a method comprising: receiving sidelink control information sent from a relay user equipment; and performing flow control for ingress data sent from an apparatus to the relay user equipment to be relayed to a destination user equipment paired with the apparatus based on the sidelink control information sent from the relay user equipment.

The sidelink control information sent from the relay user equipment may comprise at least one of: sidelink control information sent from the relay user equipment to the apparatus; sidelink control information sent from the relay user equipment to the destination user equipment paired with the apparatus; or sidelink control information sent from the relay user equipment to another destination user equipment not paired with the apparatus.

Performing flow control for the ingress data sent from the apparatus to the relay user equipment to be relayed to the destination user equipment paired with the apparatus may comprise: reducing some or all of the ingress data sent from the apparatus to the relay user equipment to be relayed to the destination user equipment paired with the apparatus; or stopping some or all of the ingress data from being sent from the apparatus to the relay user equipment to be relayed to the destination user equipment paired with the apparatus.

Performing flow control for the ingress data sent from the apparatus to the relay user equipment to be relayed to the destination user equipment paired with the apparatus may comprise: determining an amount of ingress data previously sent from the apparatus to the relay user equipment to be relayed to the destination user equipment paired with the apparatus and buffered by the relay user equipment based on the sidelink control information sent from the relay user equipment; and performing flow control for ingress data subsequently sent from the apparatus to the relay user equipment to be relayed to the destination user equipment paired with the apparatus based on the determining.

The method may comprise: determining an amount of ingress data previously sent from the apparatus to the relay user equipment to be relayed to the destination user equipment paired with the apparatus and buffered by the relay user equipment based on the sidelink control information sent from the relay user equipment per a specific priority class or per all priority classes.

The method may comprise: determining an amount of ingress data previously sent from the apparatus to the relay user equipment to be relayed to the destination user equipment paired with the apparatus and buffered by the relay user equipment further per a specific priority class based on a mapping between a priority class of ingress data previously sent from the apparatus to the relay user equipment to be relayed to the destination user equipment paired with the apparatus and a priority class of egress data sent from the relay user equipment and the destination user equipment paired with the apparatus.

The method may comprise: determining that an amount B of ingress data of a specific priority class or of all priority classes previously sent from the apparatus to the relay user equipment to be relayed to the destination user equipment paired with the apparatus and buffered by the relay user equipment is greater than a first threshold B1 over a first period of time T1 based on sidelink control information sent from the relay user equipment; and reducing an amount of ingress data of a priority class lower than a determined priority class p subsequently sent from the apparatus to the relay user equipment to be relayed to the destination user equipment paired with the apparatus.

The determined priority class p is a specific priority class of the ingress data when the amount of ingress data of a specific priority class has been determined; or the determined priority class p may be a representative priority class derived from all priority classes when the amount of ingress data of all priority classes has been determined.

The method may comprise: determining that the amount B of ingress data of a specific priority class or of all priority classes previously sent from the apparatus to the relay user equipment to be relayed to the destination user equipment paired with the apparatus and buffered by the relay user equipment is greater than a second threshold B2 over a second period of time T2 based on the sidelink control information sent from the relay user equipment, wherein the second threshold B2 is smaller than the first threshold B1, wherein the second period of time T2 is greater than the first period of time T1; and stopping ingress data of a priority class lower than the determined priority class p from being subsequently sent from the apparatus to the relay user equipment to be relayed to the destination user equipment paired with the apparatus and/or reducing an amount of ingress data of a priority class equal to the determined priority class p subsequently sent from the apparatus to the relay user equipment to be relayed to the destination user equipment paired with the apparatus.

The method may comprise: determining that the amount B of ingress data of a specific priority class or of all priority classes previously sent from the apparatus to the relay user equipment to be relayed to the destination user equipment paired with the apparatus and buffered by the relay user equipment is greater than a third threshold B3 over a third period of time T3 based on the sidelink control information sent from the relay user equipment, wherein the third threshold B3 is smaller than the second threshold B2, wherein the third period of time T3 is greater than the second period of time T2; and sending user equipment assistance information to the relay user equipment, sending user equipment assistance information to the destination user equipment paired with the apparatus and/or sending a relay user equipment reselection request to the destination user equipment paired with the apparatus.

Multiple destination user equipment may be paired with the apparatus via the relay user equipment.

The method may comprise: determining an amount of ingress data previously sent from the apparatus to the relay user equipment to be relayed to the destination user equipment paired with the apparatus and buffered by the relay user equipment per destination user equipment paired with the apparatus based on the sidelink control information sent from the relay user equipment.

Determining an amount of ingress data previously sent from the apparatus to the relay user equipment to be relayed to the destination user equipment paired with the apparatus and buffered by the relay user equipment based on the sidelink control information sent from the relay user equipment may comprise: determining an amount of ingress data previously sent from the apparatus to the relay user equipment to be relayed to the destination user equipment paired with the apparatus; determining an amount of egress data previously sent from the relay user equipment to the destination user equipment paired with the apparatus based on the sidelink control information sent from the relay user equipment; and determining a difference between the amount of ingress data previously sent from the apparatus to the relay user equipment to be relayed to the destination user equipment paired with the apparatus and the amount of egress data previously sent from the relay user equipment to the destination user equipment paired with the apparatus.

Determining the amount of ingress data previously sent from the apparatus to the relay user equipment to be relayed to the destination user equipment paired with the apparatus and buffered by the relay user equipment may be further based on at least one of: a load at the relay user equipment; a priority policy at the relay user equipment; or channel conditions between the relay user equipment and the destination user equipment paired with the apparatus.

According to an aspect there is provided a computer program comprising computer executable code which when run on at least one processor is configured to: receive sidelink control information sent from a relay user equipment; and perform flow control for ingress data sent from the apparatus to the relay user equipment to be relayed to a destination user equipment paired with an apparatus based on the sidelink control information sent from the relay user equipment.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

LIST OF ABBREVIATIONS

AF Application Function
AMF: Access and Mobility Management Function
API: Application Programming Interface
BS: Base Station
CSI: Channel State Information
CU: Centralized Unit
E2E: End to End
DL: Downlink
DRX: Discontinuous Reception
DU: Distributed Unit
DST: Destination
gNB: gNodeB
GSM: Global System for Mobile communication
HARQ: Hybrid Automatic Repeat Request
HSS: Home Subscriber Server
ID: Identifier
IoT: Internet of Things
L2: Layer 2
LTE: Long Term Evolution
MAC: Medium Access Control
MS: Mobile Station
MTC: Machine Type Communication
NEF: Network Exposure Function NF Network Function
NR: New radio
NRF: Network Repository Function
NW: Network
PDB: Packet Delay Budget
PDU: Packet Data Unit
PSCCH: Physical Sidelink Control Channel
PSFCH: Physical Sidelink Feedback Channel
PSSCH: Physical Sidelink Shared Channel
RAM: Random Access Memory
(R)AN: (Radio) Access Network
ROM: Read Only Memory
SCI: Sidelink Control Information
SMF: Session Management Function
SRC: Source
TB Transport Block
TBS: Transport Block Size
TR: Technical Report
TS: Technical Specification
U2U: User to User
UE: User Equipment
UMTS: Universal Mobile Telecommunication System
V2X: Vehicle to everything
3GPP: $3^{rd}$ Generation Partnership Project
5G: $5^{th}$ Generation
5GC: 5G Core network
5GS: 5G System

BRIEF DESCRIPTION OF THE FIGURES

Embodiments will now be described, by way of example only, with reference to the accompaning Figures in which:

FIG. 6 shows a block diagram of a method for performing flow control for ingress data sent from a source user equipment to a relay user equipment to be relayed to a destination user equipment paired with the source user equipment;

DETAILED DESCRIPTION REFERRING TO THE FIGURES

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
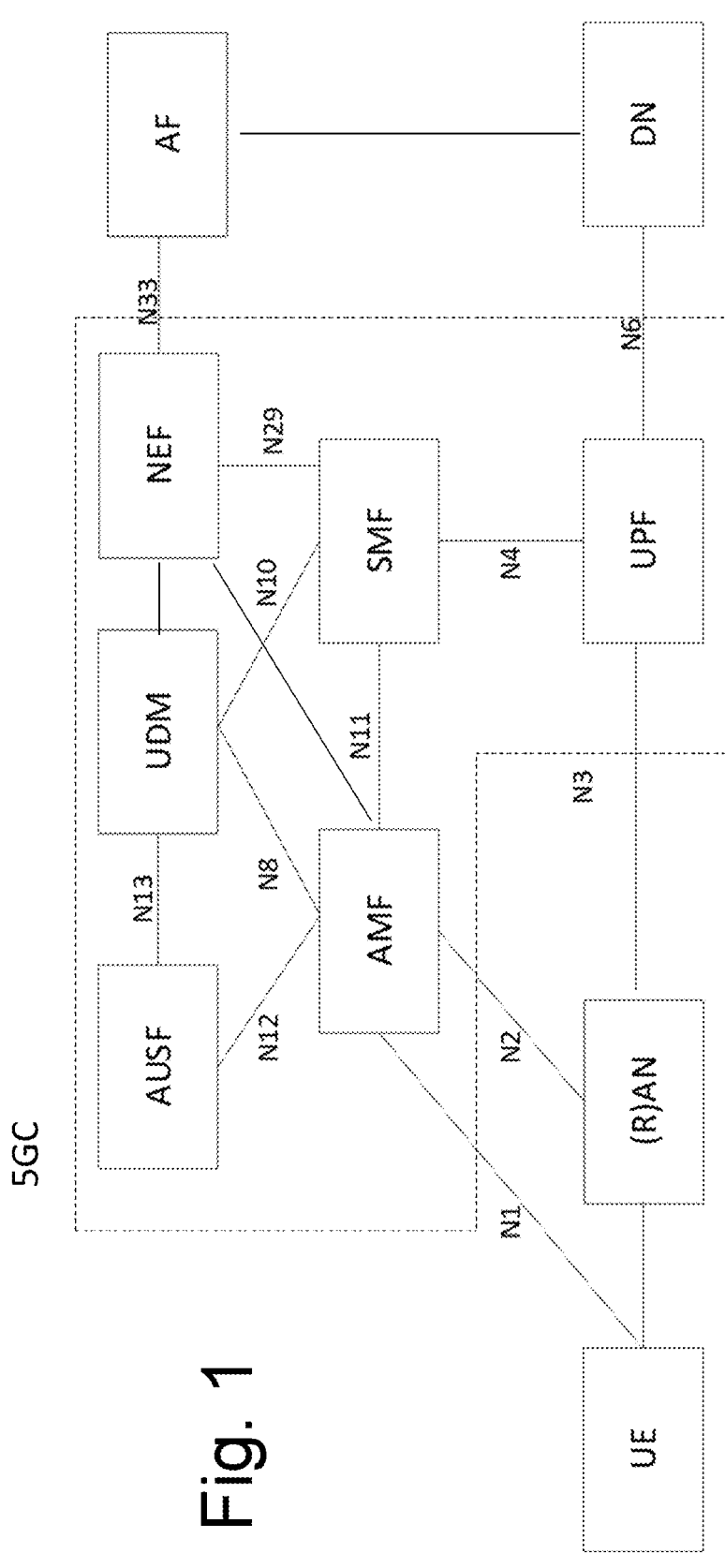
FIG. 1 shows a schematic representation of a 5G system.

FIG. 1 shows a schematic representation of a 5G system (5GS). The 5GS may comprises a user equipment (UE), a (radio) access network ((R)AN), a 5G core network (5GC), one or more application functions (AF) and one or more data networks (DN).

The 5G (R)AN may comprise one or more gNodeB (gNB) distributed unit functions connected to one or more gNodeB (gNB) centralized unit functions.

The 5GC may comprise an access and mobility management function (AMF), a session management function (SMF), an authentication server function (AUSF), a user data management (UDM), a user plane function (UPF) and/or a network exposure function (NEF).

Figure 2:
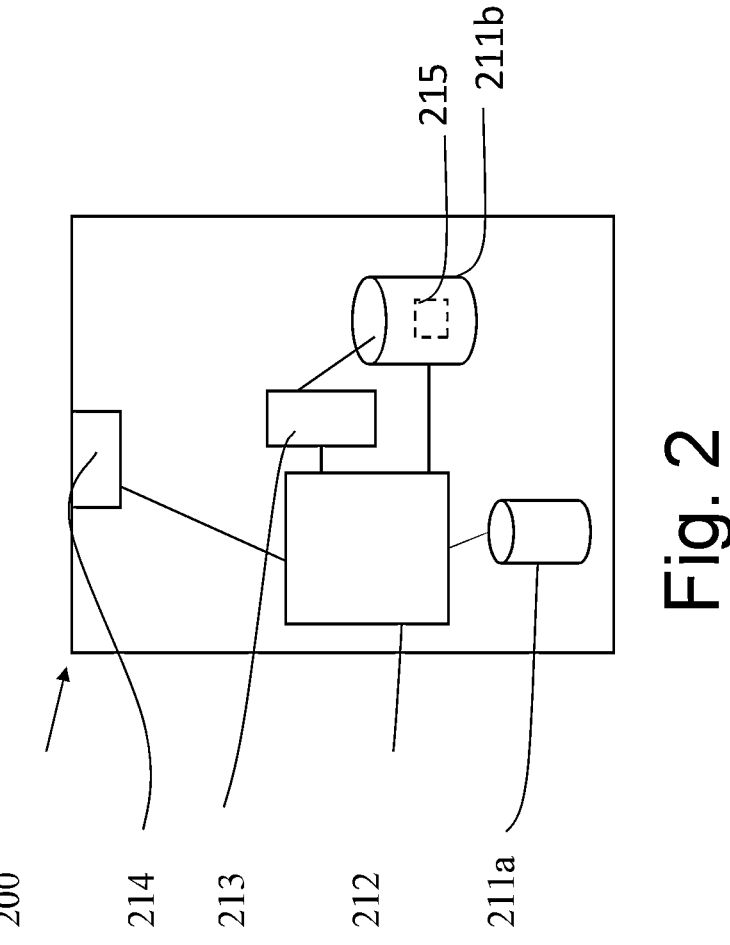
FIG. 2 shows a schematic representation of a control apparatus.

FIG. 2 illustrates an example of a control apparatus 200 for controlling a function of the (R)AN or the 5GC as illustrated on FIG. 1. The control apparatus may comprise at least one random access memory (RAM) 211a, at least on read only memory (ROM) 211b, at least one processor 212, 213 and an input/output interface 214. The at least one processor 212, 213 may be coupled to the RAM 211a and the ROM 211b. The at least one processor 212, 213 may be configured to execute an appropriate software code 215. The software code 215 may for example allow to perform one or more steps to perform one or more of the present aspects. The software code 215 may be stored in the ROM 211b. The control apparatus 200 may be interconnected with another control apparatus 200 controlling another function of the 5G (R)AN or the 5GC. In some embodiments, each function of the (R)AN or the 5GC comprises a control apparatus 200. In alternative embodiments, two or more functions of the (R)AN or the 5GC may share a control apparatus.

Figure 3:
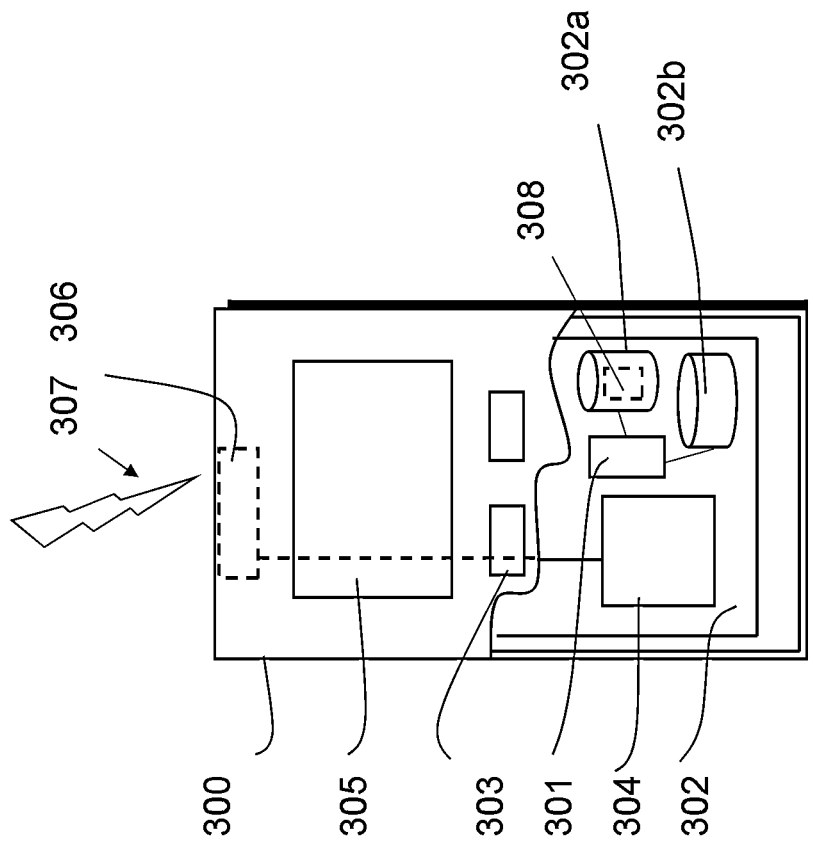
FIG. 3 shows a schematic representation of a user equipment.

FIG. 3 illustrates an example of a UE 300, such as the UE illustrated on FIG. 1. The UE 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, a Cellular Internet of things (CIoT) device or any combinations of these or the like. The UE 300 may provide, for example, communication of data for carrying communications. The communications may be one or more of voice, electronic mail (email), text message, multimedia, data, machine data and so on.

The UE 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The UE 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 302b and the ROM 302a. The at least one processor 301 may be configured to execute an appropriate software code 308. The software code 308 may for example allow to perform one or more of the present aspects. The software code 308 may be stored in the ROM 302a.

The processor, storage and other relevant control apparatus can be provided on an appropriate circuit board and/or in chipsets. This feature is denoted by reference 304. The device may optionally have a user interface such as keypad 305, touch sensitive screen or pad, combinations thereof or the like. Optionally one or more of a display, a speaker and a microphone may be provided depending on the type of the device.

3GPP Release 18 comprises specifications for indirect sidelink (SL) communications between a source (SRC) UE and a destination (DST) UE paired with the SRC UE via a relay UE.

In this disclosure a relay UE may also be referred to as a UE-to-UE (U2U) relay UE. A SRC UE may also be referred to as a transmitting (TX) UE and a DST UE may also be referred to as a receiving (RX) UE.

In this disclosure the expression "paired with" may be interchanged with the expression "connected with", "associated with", "peered with" or "partnered with". It will be understood that the expression "paired with" is not limited to a 1:1 relationship. That is, the SRC UE may be paired with one DST UE or more than one DST UE.

In this disclosure a UE may either be a SRC UE or a DST UE and another UE paired with the UE may either be a DTS UE or a SRC UE depending on the direction of communications. That is, in one direction the UE may be the SRC UE and the UE paired with the UE may be the DST UE. In another direction the UE may be the DST UE and the other UE paired with the UE may be the SRC UE.

RP-221262 reads as follows.

The objective of this work item is to specify solutions that are needed to enhance NR Sidelink Relay for the V2X, public safety and commercial use cases.

1. Specify mechanisms to support single-hop Layer-2 and Layer-3 UE-to-UE relay (i.e., source UE→relay UE→destination UE) for unicast [RAN2, RAN3, RAN4].

A. Common part for Layer-2 and Layer-3 relay to be prioritized until RAN #98 i. Relay discovery and (re)selection [RAN2, RAN4]

ii. Signalling support for Relay and remote UE authorization if SA2 ii. concludes it is needed [RAN3]

B. Layer-2 relay specific part i. UE-to-UE relay adaptation layer design [RAN2]

ii. Control plane procedures [RAN2]

QoS handling if needed, subject to SA2 progress [RAN2]

Note 1A: This work should take into account the forward compatibility for supporting more than one hop in a later release.

Note 1B: A remote UE is connected to only a single relay UE at a given time for a given destination UE.

3GPP Release 16 comprises specifications for direct SL communications from a SRC UE to a DST UE. Two SL resource allocation modes are provided to perform direct SL communications from a SRC UE to a DST UE. The SRC UE may be configured with one of these SL resource allocation modes. These SL resource allocation modes may be referred to as NR SL mode 1 and NR SL mode 2.

In NR SL mode 1, SL resources to perform direct SL communications from a SRC UE to a DST UE may be allocated (i.e. scheduled) by the network (e.g. gNB) to the SRC UE. The configuration and operation are similar to that applied over the Uu interface. The medium access control (MAC) level details may be found in section 5.8.3 of 3GPP TS 38.321.

Figure 4:
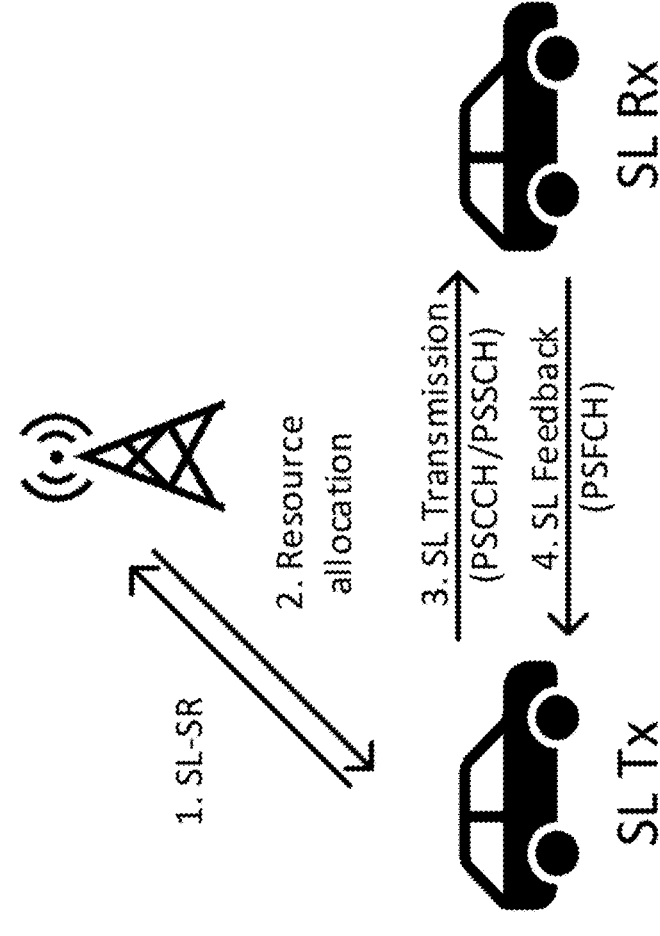
FIG. 4 shows a schematic representation of a first mode for allocating sidelink resources.

FIG. 4 shows a schematic representation of the NR SL mode 1.

In NR SL mode 2 SL resources to perform direct SL communications from a SRC UE to a DST UE may be autonomously allocated by the SRC UE with the aid of a sensing procedure. The SRC UE may first perform a sensing procedure over one or more configured SL resource pools in order to determine available SL resources (i.e. SL resources not used by nearby UEs). Then, the SRC UE may perform SL resource allocation amongst the available SL resources.

Figure 5:
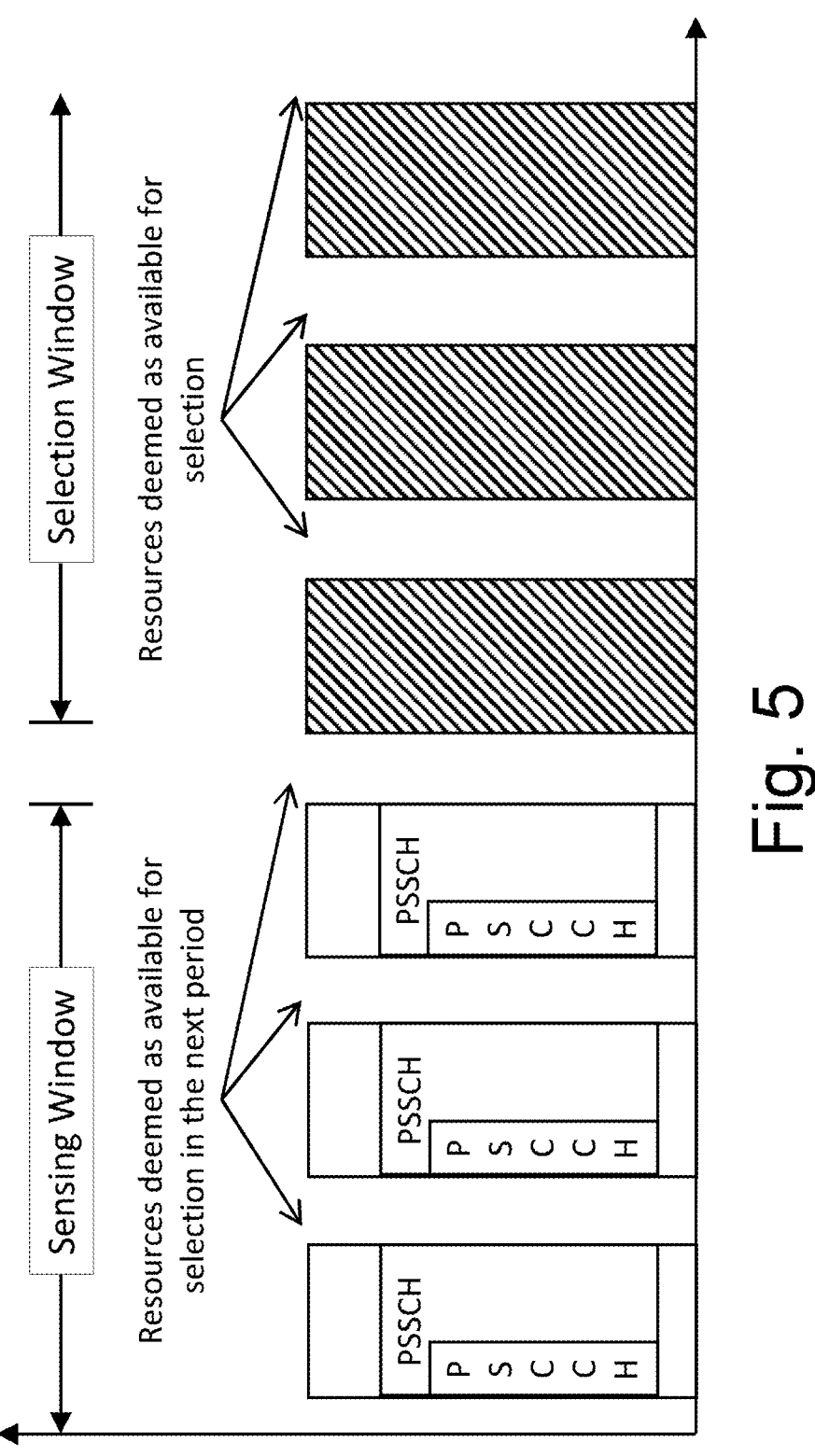
FIG. 5 shows a schematic representation of a second mode for allocating sidelink resources.

FIG. 5 shows a schematic representation of the NR SL mode 2.

To be able to perform the sensing procedure and to obtain information to receive a SL transmission in NR SL mode 2, the SRC UE may receive (i.e. decode) sidelink control information (SCI) sent from nearby SRC UEs. The SCI may include a first stage SCI and a second stage SCI. A motivation is to support size difference between the SCIs for various NR vehicle to everything (V2X) SL service types (e.g., broadcast, groupcast and unicast).

The content of the first stage SCI and the second stage SCI is standardized in 3GPP TS 38.212.

The first stage SCI, carried by a physical sidelink control channel (PSCCH), may comprise information to enable sensing operations. The first stage SCI may comprise information to determine SL resource allocation of a physical sidelink shared channel (PSSCH). The first stage SCI may comprise information to decode 2nd-stage SCI. Section 8.3.1.1 of 3GPP TS 38.212 reads as follows.

SCI format 1-A is used for the scheduling of PSSCH and $2^{nd}$-stage-SCI on PSSCH The following information is transmitted by means of the SCI format 1-A:

Priority—3 bits as defined in clause 5.4.3.3 of [12, TS 23.287].

Frequency resource assignment $$-\left\lceil \log_2\left( \frac{N_{subChannel}^{SL}\left(N_{subChannel}^{SL}+1\right)}{2} \right) \right\rceil \text{ bits}$$

when the value of the higher layer parameter sl-MaxNumPerReserve is configured to 2; otherwise $$\left\lceil \log_2\left( \frac{N_{subChannel}^{SL}\left(N_{subChannel}^{SL}+1\right)\left(2N_{subChannel}^{SL}+1\right)}{6} \right) \right\rceil \text{ bits}$$

when the value of the higher layer parameter sl-MaxNumPerReserve is configured to 3, as defined in clause 8.1.2.2 of [6, TS 38.214].

Time resource assignment—5 bits when the value of the higher layer parameter sl-MaxNumPerReserve is configured to 2; otherwise 9 bits when the value of the higher layer parameter sl-MaxNumPerReserve is configured to 3, as defined in clause 8.1.2.1 of [6, TS 38.214].

Resource reservation period—⌈log 2 $N_{rsv\_period}$⌉ bits as defined in clause 8.1.4 of [6, TS 38.214], where $N_{rsv}$-

_period_ is the number of entries in the higher layer parameter sl-ResourceReservePeriodList, if higher layer parameter sl-MultiReserveResource is configured; 0 bit otherwise.

DMRS pattern—$\lceil \log 2\ N_{pattern} \rceil$ bits as defined in clause 8.4.1.1.2 of [4, TS 38.211], where $N_{pattern}$ is the number of DMRS patterns configured by higher layer parameter sl-PSSCH-DMRS-TimePatternList; 0 bit if sl-PSSCH-DMRS-TimePatternList is not configured.

$2^{nd}$-stage SCI format—2 bits as defined in Table 8.3.1.1-1.

Beta_offset indicator—2 bits as provided by higher layer parameter sl-BetaOffsets2ndSCI and Table 8.3.1.1-2.

Number of DMRS port—1 bit as defined in Table 8.3.1.1-3.

Modulation and coding scheme—5 bits as defined in clause 8.1.3 of [6, TS 38.214].

Additional MCS table indicator—as defined in clause 8.1.3.1 of [6, TS 38.214]: 1 bit if one MCS table is configured by higher layer parameter sl-Additional-MCS-Table; 2 bits if two MCS tables are configured by higher layer parameter sl-Additional-MCS-Table; 0 bit otherwise.

PSFCH overhead indication—1 bit as defined clause 8.1.3.2 of [6, TS 38.214] if higher layer parameter sl-PSFCH-Period=2 or 4; 0 bit otherwise.

Reserved—a number of bits as determined by higher layer parameter sl-NumReservedBits, with value set to zero.

TABLE 8.3.1.1-1

$2^{nd}$-stage SCI formats

| Value of 2nd-stage SCI format field | 2nd-stage SCI format |
|---|---|
| 00 | SCI format 2-A |
| 01 | SCI format 2-B |
| 10 | Reserved |
| 11 | Reserved |

The second stage SCI (SCI format 2-A and 2-B) may be carried by PSSCH. The second stage SCI may be multiplexed with a sidelink shared channel (SL-SCH). The second stage SCI may comprise source and destination identities. The second stage SCI may comprise information to identify and decode the associated SL-SCH transport block. The second stage SCI may comprise information to control of hybrid automatic repeat request (HARQ) feedback in unicast/groupcast. The second stage SCI information may be used to trigger for channel state information (CSI) feedback in unicast.

Section 8.4.1.1 of 3GPP TS 38.212 reads as follows.

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits as defined in clause 16.4 of [5, TS 38.213].

New data indicator—1 bit as defined in clause 16.4 of [5, TS 38.213].

Redundancy version—2 bits as defined in clause 16.4 of [6, TS 38.214].

Source ID—8 bits as defined in clause 8.1 of [6, TS 38.214].

Destination ID—16 bits as defined in clause 8.1 of [6, TS 38.214].

HARQ feedback enabled/disabled indicator—1 bit as defined in clause 16.3 of [5, TS 38.213].

Cast type indicator—2 bits as defined in Table 8.4.1.1-1.

CSI request—1 bit as defined in clause 8.2.1 of [6, TS 38.214].

Section 8.4.1.2 of 3GPP TS 38.212 reads as follows.

SCI format 2-B is used for the decoding of PSSCH, with HARQ operation when HARQ-ACK information includes only NACK, or when there is no feedback of HARQ-ACK information.

The following information is transmitted by means of the SCI format 2-B:

HARQ process number—4 bits as defined in clause 16.4 of [5, TS 38.213].

New data indicator—1 bit as defined in clause 16.4 of [5, TS 38.213].

Redundancy version—2 bits as defined in clause 16.4 of [6, TS 38.214].

Source ID—8 bits as defined in clause 8.1 of [6, TS 38.214].

Destination ID—16 bits as defined in clause 8.1 of [6, TS 38.214].

HARQ feedback enabled/disabled indicator—1 bit as defined in clause 16.3 of [5, TS 38.213].

Zone ID—12 bits as defined in clause 5.8.11 of [9, TS 38.331].

Communication range requirement—4 bits determined by higher layer parameter sl-ZoneConfigMCR-Index.

A mechanism has been proposed to perform quality of service (QOS) control for indirect SL communications from a SRC UE to a DST UE paired with the SRC UE via a relay UE. For example, the mechanism may comprise setting a maximum bit rate for the SRC UE or for the DST UE paired with the SRC UE.

A mechanism has been proposed to perform inter-UE coordination (IUIC) for enhancing SL resource allocation.

A mechanism has been proposed for exchanging SL assistance information for SL discontinuous reception (DRX) configuration between a SRC UE and a DST UE paired with the SRC UE over a SL.

No mechanism has however been proposed to perform flow control for indirect SL communications from a SRC UE to a DST UE paired with the SRC UE via a relay UE. This may be desirable, in particular in scenarios where the relay UE may serve a plurality of unicast indirect SL communications from SRC UEs to DST UEs paired with the SRC UEs, where the relay UE may also perform unicast direct SL communications with DST UEs paired with the relay UE and/or where the relay UE may also perform groupcast direct SL communications with DST UEs grouped with the relay UE.

In this disclosure it may be assumed that a SRC UE, a DST UE and/or a relay UE may operate in half-duplex mode. That is, a SRC UE, a DST UE and/or a relay UE may not transmit and receive at the same time on the same SL carrier or sub-band of a SL carrier.

One or more aspects of this disclosure provide a mechanism to configure a SRC UE to determine when and/or how to perform flow control for indirect SL communications from a SRC UE to a DST UE paired with the SRC UE via a relay UE.

One or more aspects of this disclosure provide a mechanism to configure a SRC UE to determine when and/or how to perform flow control for ingress data sent from the SRC UE to the relay UE to be relayed to the DST UE paired with the SRC UE.

As explained above, in NR SL mode 2 a UE may need to monitor SCI sent from neighboring UEs for sensing operation or receiving SL communications.

One or more aspects of this disclosure provide a mechanism to configure a SRC UE to monitor SCI sent from a relay UE and to determine when and/or how to perform flow control for ingress data sent from the SRC UE to the relay UE to be relayed to a DST UE paired with the SRC UE.

The SCI sent from the relay UE may comprise SCI sent from the relay UE to the SRC UE. The SCI sent from the relay UE may comprise SCI sent from the relay UE to the DST UE paired with the SRC UE. The SCI sent from the relay UE may comprise SCI sent from the relay UE to another DST UE not paired with the SRC UE.

It may be assumed that because the SRC UE is served by the relay UE, the SRC UE is in the proximity of the relay UE and is able to receive the SCI sent from the relay UE. The validity of this assumption is discussed below, considering impacts of channel conditions and transmit power control on the channel between the SRC UE and the relay UE and the channel between the relay UE and the DST UE paired with the SRC UE.

It may further be assumed that a layer 2 (L2) identifier ID of the relay UE and at least the L2 ID of the DST UE paired with the SRC UE are known to the SRC UE. For example, the L2 ID of the relay UE and the L2 ID of the DST UE paired with the SRC UE are known from setup or maintenance of an indirect connection between the SRC UE and the DST UE paired with the SRC UE. The L2 ID may be allocated by the upper layer above access stratum, according to 3GPP specification of SL. It will be understood that more than one DST UE may be paired to the same SRC UE or the same DST UE may be paired to more than one SRC UE via the same relay UE.

The L2 ID of the relay UE may be used as SRC ID in the SCI sent from the relay UE to the SRC UE, in the SCI sent from the relay UE to the DST UE paired with the SRC UE and in the SCI sent from the relay UE to the DST UE not paired with the SRC UE. It will be understood that more than one DST UE may be not paired to the SRC UE.

The L2 ID of the SRC UE may be used as DST ID in the SCI sent from the relay UE to the SRC UE.

The L2 ID of the DST UE paired with the SRC UE may be used as DST ID in the SCI sent from the relay UE to the DST UE paired with the SRC UE.

The L2 ID of the DST UE not paired with the SRC UE may be used as DST ID in the SCI sent from the relay UE to the DST UE not paired with the SRC UE.

In this way, monitoring the SCI sent from the relay UE is easy to implement and does not suffer from unknown or ambiguous SRC ID(s) and DST ID(s). The SCI structures, formats, and contents may be as defined in 3GPP TS 38.212.

The SRC UE may determine resource allocation and transport block size (TBS) for ingress data sent from the SRC UE to the relay UE to be relayed to the DST UE paired with the SRC UE based on the SCI sent from the relay UE.

The SRC UE may determine resource allocation and transport block size (TBS) the relay UE is using for egress data sent from the relay UE to the DST UE paired with the SRC UE based on the SCI sent from the relay UE to the DST UE.

The egress data may comprise ingress data received from the SRC UE to be relayed to the DST UE paired with the SRC UE.

It will be understood that there may be one or more resource reservation(s) and TBS(s) from the relay UE for egress data sent from the relay UE to the DST UE paired with the SRC UE based on the SCI sent from the relay UE to the DST UE. Each resource reservation and TBS may be specific to a priority class. Each resource reservation and TBS may be specific to a pair of SRC ID and DST ID.

In this disclosure a priority class may refer to a priority level or a priority value. As per section 5.4.3.3 the lower the priority class the higher the priority may be.

A resource allocation may be determined based on the first stage of the SCI sent from the relay UE, as it is indicated in the SCI.

A TBS may be determined based on the first stage of the SCI sent from the relay UE. The TBS may be determined based on the resource allocation and the MCS indicated in the SCI.

A priority class may be determined based on the first stage of the SCI sent from the relay UE, as it is indicated in the SCI.

There may be a mapping between the priority class of ingress data sent from the SRC UE to the relay UE to be relayed to the DST UE paired with the SRC UE and the priority class of egress data sent from the relay UE to the DST UE paired with the SRC UE. The priority class of ingress data sent from the SRC UE to the relay UE to be relayed to the DST UE paired with the SRC UE and the priority class of egress data sent from the relay UE to the DST UE paired with the SRC UE may be the same or different. The priority class of ingress data sent from the SRC UE to the relay UE to be relayed to the DST UE paired with the SRC UE and the priority class of egress data sent from the relay UE to the DST UE paired with the SRC UE may be static, semi-static or dynamic.

The mapping may be specific to the relay UE (i.e. different relay UEs may have different mappings). The mapping may or may not be known in advance by the SRC UE. The SRC UE may receive the mapping from the relay UE.

The mapping may or may not be a 1:1 mapping between the priority class of ingress data sent from the SRC UE to the relay UE to be relayed to the DST UE paired with the SRC UE and the priority class of egress data sent from the relay UE to the DST UE paired with the SRC UE.

When the mapping is not a 1:1 mapping between the priority class of ingress data sent from the SRC UE to the relay UE to be relayed to the DST UE paired with the SRC UE and the priority class of egress data sent from the relay UE to the DST UE paired with the SRC UE, one or more representative priority classes may be introduced for ingress data sent from the SRC UE to the relay UE to be relayed to the DST UE paired with the SRC UE (the concept of representative priority class is discussed below). There may then be a 1:1 mapping between the representative priority class of ingress data sent from the SRC UE to the relay UE to be relayed to the DST UE paired with the SRC UE and the priority class of egress data sent from the relay UE to the DST UE paired with the SRC UE. A possibility of determining a representative priority class is discussed below.

It will be understood that ingress data sent from the SRC UE to the relay UE to be relayed to the DST UE paired with the SRC UE may have multiple priority classes. That is, some ingress data sent from the SRC UE to the relay UE to be relayed to the DST UE paired with the SRC UE may have a priority class and other ingress data sent from the SRC UE to the relay UE to be relayed to the DST UE paired with the SRC UE may have another priority class.

A pair of SRC ID and DST ID may be determined based on the second stage of the SCI sent from the relay UE. That is, a part of the L2 ID of the relay UE and a part of the L2 ID of the DST UE are indicated as the SRC ID and DST ID in the second stage of the SCI from the relay UE.

The SRC UE may determine an amount of ingress data previously sent from the SRC UE to the relay UE to be relayed to the DST UE paired with the SRC UE (e.g. sum of all ingress TBs sent from the SRC UE to the relay UE to be relayed to the DST UE paired with the SRC UE).

The SRC UE may determine an amount of egress data previously sent from the relay UE to the DST UE paired with the SRC UE based on the SCI sent from the relay UE (e.g. sum of all egress TBs previously sent from the relay UE to the DST UE paired with the SRC UE based on the SCI sent from the relay UE to the DST UE).

The SRC may determine a difference between the amount of ingress data previously sent from the SRC UE to the relay UE to be relayed to the DST UE paired with the SRC UE and the amount of egress data previously sent from the relay UE to the DST UE paired with the SRC UE. This difference is denoted as B, representing the remaining amount of ingress data from the SRC UE that may still be buffered at the relay UE in case B is positive. In other words, B is an amount of ingress data previously sent from the apparatus to the relay user equipment to be relayed to the destination user equipment paired with the apparatus and buffered by the relay user equipment.

It may be noted that the SRC UE may not be able to determine whether the relay UE has successfully specifically relayed the ingress data previously sent from the SRC UE to the relay UE to be relayed to the DST UE paired with the SRC UE to the DST UE paired with the SRC UE based on the SCI sent from the relay UE to the DST UE paired with the SRC UE. The SRC UE may at most determine that the relay UE has relayed ingress data (regardless of whether it has been previously sent from the SRC UE to the relay UE to be relayed to the DST UE paired with the SRC UE) to the DST UE paired with the SRC UE based on the SCI sent from the relay UE to the DST UE paired with the SRC UE. This may include determining how many SL HARQ retransmissions have been performed with the DST UE paired of the SRC UE.

As explained above, the SRC UE may determine the amount B of ingress data previously sent from the SRC UE to the relay UE to be relayed to the DST UE paired with the SRC UE and buffered by the relay UE based on the SCI sent from the relay UE. Additionally, the SRC may determine the amount B of ingress data previously sent from the SRC UE to the relay UE to be relayed to the DST UE paired with the SRC UE and buffered by the relay UE based on other factors such as a load at the relay UE, a priority policy at the relay UE (i.e. traffic prioritization) and/or channel state information (CSI) (e.g. pathloss or channel conditions) between the relay UE and the DST UE paired with the SRC UE.

The SRC UE may determine the load at the relay UE based on various parameters.

The SRC UE may determine the load at the relay UE based on a number N of UEs served by the relay UE in addition to the SRC UE and the DST UE paired with the SRC UE. The number N of UEs served by the relay UE may be determined based on a number of different DST IDs within the SCI sent from the relay UE (where the L2 ID of the relay UE is the SRC UE) in addition to the DST IDs of the SRC UE and the DST UE paired with the SRC UE.

The SRC UE may assume that a UE among the number N of UEs served by the relay UE is released from the relay UE if the SRC UE does not receive any SCI from the relay UE with the DST ID of the UE for a time period.

The SRC UE may determine the load at the relay UE based on the number M of different L2 IDs used by the relay UE as SRC IDs for indirect SL communications between a SRC UE and a DST UE paired with the SRC UE via the relay UE and/or for direct SL communications between the relay UE and a UE or a group of UEs. The SRC UE may receive an indication from the relay UE of the number M of L2 IDs used by the relay UE as SRC IDs for indirect SL communications between a SRC UE and a DST UE paired with the SRC UE via the relay UE and/or for direct SL communications between the relay UE and a UE or a group of UEs.

The SRC UE may determine the load at the relay UE based on SCI sent from other SRC UEs to the relay UE in addition to SCI sent from the relay UE.

The SRC UE may determine the load at the relay UE bearing in mind a half-duplex operation at the relay UE.

The SRC UE may determine the load at the relay UE based on the amount and/or priority class of the ingress data sent from the SRC UE to the relay UE to be relayed to the DST UE paired with the SRC UE and the amount and/or priority class of the ingress data sent from another SRC UE to the relay UE to be relayed to another DST UE paired with the other SRC UE. The amount and/or priority class of the ingress data sent from another SRC UE to the relay UE to be relayed to another DST UE paired with the other SRC UE may be determined based on SCI sent from the other SRC UEs.

The SRC UE may determine the load at the relay UE based on the amount and/or priority class of the ingress data sent from the SRC UE to the relay UE to be relayed to the DST UE paired with the SRC UE and the amount and/or priority class of the egress data sent from the relay UE. The amount and/or priority class of the egress data sent from the relay UE may be determined based on SCI sent from the relay UE.

When there is a mapping between the priority class of ingress data sent from the SRC UE to the relay UE to be relayed to the DST UE paired with the SRC UE and the priority class of egress data sent from the relay UE to the DST UE paired with the SRC UE and the mapping is known to the SRC UE, the SRC UE may determine the amount B of ingress data previously sent from the SRC UE to the relay UE to be relayed to the DST UE paired with the SRC UE and buffered by the relay UE per a specific priority class or per all priority classes. Otherwise, the SRC UE may determine the amount B of ingress data previously sent from the SRC UE to the relay UE to be relayed to the DST UE paired with the SRC UE and buffered by the relay UE per all priority classes.

When there are multiple DST UEs paired with the same SRC UE, the SRC UE may determine the amount B of ingress data previously sent from the SRC UE to the relay UE to be relayed to the DST UE paired with the SRC UE and buffered by the relay UE per a specific DST UE or per all DST UEs.

When there are multiple SRC UEs paired with the same DST UE, ingress data sent from the multiple SRC UEs to the relay UE to be relayed to the DST UE may be multiplexed by the relay UE. The relay UE may send egress data comprising the multiplexed ingress data to the DST UE. In this case, the amount B of ingress data previously sent from the SRC UE to the relay UE to be relayed to the DST UE paired with the SRC UE and buffered by the relay UE may be negative. Indeed, the egress data sent from the relay UE to the DST UE determined by the SRC UE based on the SCI sent from the relay UE may be larger than the ingress data sent from the SRC UE to be relayed to the DST UE.

The amount B of ingress data previously sent from the SRC UE to the relay UE to be relayed to the DST UE paired with the SRC UE and buffered by the relay UE may also be negative in case the relay UE has to use more than one SL HARQ process to send the same egress data to the DST UE paired with the SRC UE. Indeed, the SRC UE may not be able to determine success or failure of HARQ at the relay UE.

When the SRC UE determines the amount B of ingress data previously sent from the SRC UE to the relay UE to be relayed to the DST UE paired with the SRC UE and buffered by the relay UE per a specific priority class, the SRC UE may perform flow control for the ingress data sent from the SRC UE to the relay UE to be relayed to the DST UE as follows.

The SRC UE may determine the amount B of ingress data previously sent from the SRC UE to the relay UE to be relayed to the DST UE paired with the SRC UE and buffered by the relay UE with the specific priority class p over time.

If the amount B of ingress data previously sent from the SRC UE to the relay UE to be relayed to the DST UE paired with the SRC UE and buffered by the relay UE with the specific priority class p is greater than a threshold B1 over a time period T1, the SRC UE may reduce an amount of ingress data of a priority class lower than the specific priority class p subsequently sent from the SRC UE to the relay UE to be relayed to the DST UE paired with the SRC UE.

T1 may be determined by the SRC UE. T1 may be a portion of an end to end (E2E) packet delay budget (PDB) configured for the specific priority class p designated PDB (p). For example, T1 may be equal to 50% PDB(p).

B1 may be determined by the SRC UE. B1 may be a static, semi-static or dynamic parameter. B1 may be determined for the specific priority class p. B1 may be a function of a channel busy ratio (CBR) measured over a configured resource pool used by the SRC UE for SL transmissions. B1 may be a function of a load of the relay UE. The load of the relay UE may depend on the number of SRC UEs and/or DST UEs served by the relay UE.

If the amount B of ingress data previously sent from the SRC UE to the relay UE to be relayed to the DST UE paired with the SRC UE and buffered by the relay UE with the specific priority class p is greater than a threshold B2 over a time period T2, the SRC UE may stop (i.e. suspend or interrupt) ingress data of a priority class lower than the specific priority class p from being subsequently sent from the SRC UE to the relay UE to be relayed to the DST UE paired with the SRC UE. T2 may be determined by the SRC UE. T2 may be greater than T1. For example, T2 may be equal to 75% of PDB(p).

B2 may be determined by the SRC UE in a similar fashion as B1. B2 may be smaller than B1.

If the amount B of ingress data previously sent from the SRC UE to the relay UE to be relayed to the DST UE paired with the SRC UE and buffered by the relay UE with the specific priority class p is greater than a threshold B3 over a time period T3, the SRC UE may stop (i.e. suspend or interrupt) ingress data of a priority class lower than or equal to the specific priority class p from being subsequently sent from the SRC UE to the relay UE to be relayed to the DST UE paired with the SRC UE. Additionally or alternatively, the SRC UE may send SL UE assistance information to the relay UE requesting a flow control resolution. The SRC UE may send SL UE assistance information to the DST UE requesting a flow control resolution. The SRC UE may send a relay UE reselection request to the DST UE.

T3 may be determined by the SRC UE. T3 may be greater than T2. For example, T3 may be equal to 90% of PDB(p).

B3 may be determined by the SRC UE in a similar fashion as B1 and B2. B3 may be smaller than B2.

When the SRC UE determines the amount B of ingress data previously sent from the SRC UE to the relay UE to be relayed to the DST UE paired with the SRC UE and buffered by the relay UE per all priority classes, the SRC UE may perform flow control for the ingress data sent from the SRC UE to the relay UE to be relayed to the DST UE as follows.

The SRC UE may determine a representative priority class based on all the priority classes of the ingress data previously sent from the SRC UE to the relay UE to be relayed to the DST UE paired with the SRC UE. For example, the representative priority class may be determined as ceil or floor of the proportional average of sum(p[i]*data [i])/sum(data[i]) where p[i] and data[i] are the priority class and corresponding amount of data the SRC UE has transmitted to the U2U Relay UE, also referred to as ingress data from the U2U Relay UE's perspective. For example, the ingress data may comprise 100 bytes with a priority class equal to 1 and 900 bytes with a priority class equal to 5. In this case the representative p may be equal to ceil or floor of (100*1+900*5)/(100+900)=4.6. That is p may be equal to 5 or 4.

It may be noted that weighting factors may be introduced for the averaging operation for further optimization. For example, the priority class equal to 1 is weighted with a factor of 2 and the priority class is weighted with a factor equal to 0.5. In this case, the representative p may be equal to ceil or floor of (100*2*1+900*5*0.5)/(100*2+900*0.5) =3,77. That is p is equal to 4 or 3.

The SRC UE may determine the amount B of ingress data previously sent from the SRC UE to the relay UE to be relayed to the DST UE paired with the SRC UE and buffered by the relay UE with the representative priority class p over time.

If the amount B of ingress data previously sent from the SRC UE to the relay UE to be relayed to the DST UE paired with the SRC UE and buffered by the relay UE with the representative priority class p is greater than a threshold B1 over a time period T1, the SRC UE may reduce an amount of ingress data of a priority class lower than the representative priority class p subsequently sent from the SRC UE to the relay UE to be relayed to the DST UE paired with the SRC UE.

T1 may be determined by the SRC UE. T1 may be a portion of an end to end (E2E) packet delay budget (PDB) configured for the specific priority class p designated PDB (p). For example, T1 may be equal to 50% of PDB(p).

B1 may be determined by the SRC UE. B1 may be a static, semi-static or dynamic parameter. B1 may be determined for the specific priority class p. B1 may be a function of a channel busy ratio (CBR) measured over a configured resource pool used by the SRC UE for SL transmissions. B1 may be a function of a load of the relay UE. The load of the relay UE may depend on the number of SRC UEs and/or DST UEs served by the relay UE.

If the amount B of ingress data previously sent from the SRC UE to the relay UE to be relayed to the DST UE paired with the SRC UE and buffered by the relay UE with the representative priority class p is greater than a threshold B2 over a time period T2, the SRC UE may stop (i.e. suspend or interrupt) ingress data of a priority class lower than the representative priority class p from being subsequently sent from the SRC UE to the relay UE to be relayed to the DST UE paired with the SRC UE.

T2 may be determined by the SRC UE. T2 may be greater than T1. For example, T2 may be equal to 75% of PDB(p).

B2 may be determined by the SRC UE in a similar fashion as B1. B2 may be smaller than B1.

If the amount B of ingress data previously sent from the SRC UE to the relay UE to be relayed to the DST UE paired with the SRC UE and buffered by the relay UE with the representative priority class p is greater than a threshold B3 over a time period T3, the SRC UE may stop (i.e. suspend or interrupt) ingress data of a priority class lower than or equal to the representative priority class p from being subsequently sent from the SRC UE to the relay UE to be relayed to the DST UE paired with the SRC UE. Additionally or alternatively, the SRC UE may send SL UE assistance information to the relay UE requesting a flow control resolution. The SRC UE may send SL UE assistance information to the DST UE requesting a flow control resolution. The SRC UE may send a relay UE reselection request to the DST UE.

T3 may be determined by the SRC UE. T3 may be greater than T2. For example, T3 may be equal to 90% of PDB(p).

B3 may be determined by the SRC UE in a similar fashion as B1 and B2. B3 may be smaller than B2.

The amount B of ingress data previously sent from the SRC UE to the relay UE to be relayed to the DST UE paired with the SRC UE and buffered by the relay UE, the thresholds B1, B2 and B3 and/or the time periods may be adjusted (e.g. up or down using weighting factors or offsets) by the SRC UE based on the load at the relay UE or the CSI the channel between the relay and the DST UE paired with the SRC UE based on the SCI sent from the relay UE to the DST UE paired with the SRC UE. This adjustment may further take into consideration impact of half-duplex operation at the SRC UE in case the SRC UE performs direct SL communications with a DST UE in addition to indirect SL communication with another DST UE the via the relay UE. The SRC UE may not be able to receive SCI from/to the relay UE when performs direct SL communications with a DST UE. For example, for each direct SL communication with a DST UE the SRC UE may increase T1, T2 or T3 by a configured amount of time.

FIG. 6 shows a block diagram of a method for performing flow control for ingress data sent from a SRC UE to a relay UE to be relayed to a DST UE paired with the SRC UE.

In step 1, the SRC UE may monitor SCI sent from the relay UE.

In step 2, the SRC UE may determine resource allocation and TBS for ingress data sent from the SRC UE to the relay UE to be relayed to the DST UE paired with the SRC UE. The SRC UE may determine resource allocation and TBS for egress data sent from the relay UE to the DST UE.

In step 3, the SRC UE may determine an amount B of ingress data previously sent from the SRC UE to the relay UE to be relayed to the DST UE paired with the SRC UE and buffered by the relay UE over time. Additionally, the SRC may determine a variation of the amount B of ingress data previously sent from the SRC UE to the relay UE to be relayed to the DST UE paired with the SRC UE and buffered by the relay UE over time.

In step 4, the SRC UE may perform flow control for ingress data subsequently sent from the SRC UE to the relay UE to be relayed to the DST UE paired with the SRC UE based on the amount B of ingress data previously sent from the SRC UE to the relay UE to be relayed to the DST UE paired with the SRC UE and buffered by the relay UE over time. Additionally, the SRC UE may perform flow control for ingress data subsequently sent from the SRC UE to the relay UE to be relayed to the DST UE paired with the SRC UE based on the variation of the amount B of ingress data previously sent from the SRC UE to the relay UE to be relayed to the DST UE paired with the SRC UE and buffered by the relay UE over time.

Figure 7:
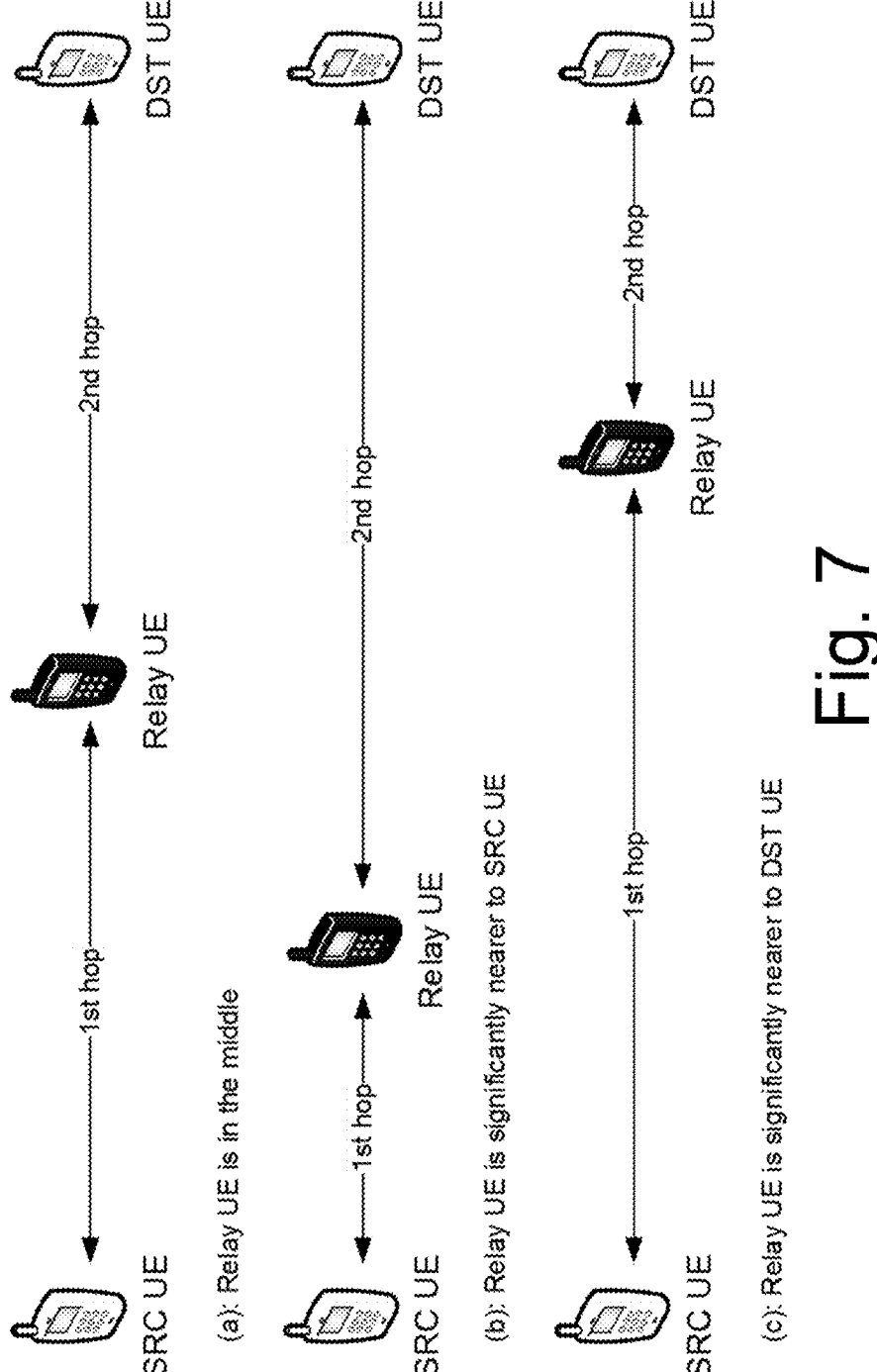
FIG. 7 shows a schematic representation of three different scenarios in a deployment comprising a source user equipment, a relay user equipment and a destination user equipment paired with the source user equipment.

FIG. 7 shows a schematic representation of three different scenarios in a deployment comprising a SRC UE, a relay UE and a DST UE paired with the SRC UE.

In a first scenario, the relay UE may be located between the SRC UE and the DST UE paired with the SRC UE in the middle.

In a second scenario, the relay UE may be located between the SRC UE and the DST UE paired with the SRC UE nearer the SRC UE.

In a third scenario, the relay UE may be located between the SRC UE and the DST UE paired with the SRC UE nearer the DST UE paired with the SRC UE.

Because SL connections and communications between the SRC UE and the relay UE and between the relay UE and the DST UE paired with the SRC UE are based on using SL unicast, transmit power control may be performed on each of the direct SL unicast connections.

When the relay UE is nearer the SRC UE (i.e. in the second scenario), the relay UE may send the SCI to the SRC UE with a reduced transmission power and vice versa when the SRC UE is transmitting to the relay UE. The relay UE may send the SCI to the DST UE with an increased transmission power and vice versa when the DST UE is transmitting to the relay UE.

The SRC UE may receive (i.e. decode) the SCI sent from the relay UE to the DST UE paired with the SRC UE with a signal quality or signal power greater than a threshold. This may indicate that the channel conditions between the relay UE and SRC UE may be better than channel conditions between the relay UE and the DST UE paired with the SRC UE. This may indicate that a bottleneck is formed at the relay UE for egress data sent from the relay UE to the DST UE paired with the SRC UE. This may indicate that no bottleneck is formed at the relay UE for egress data sent from the relay UE to the SRC UE.

The SRC UE may determine channel state information (CSI) (e.g. pathloss or channel conditions) for the channel between the relay UE and the DST UE paired with the SRC UE based on the SCI sent from the relay UE to the DST UE paired with the SRC UE. For example, the SRC UE may determine CSI (e.g. pathloss or channel conditions) for the channel between the relay and the DST UE paired with the SRC UE based on the signal quality or signal power of the SCI sent from the relay UE to the DST UE paired with the SRC UE. Additionally or alternatively, the SRC UE may determine CSI for the channel between the relay UE and the DST UE paired with the SRC UE based on the number of HARQ retransmissions and/or CSI requests indicated in the second stage of the SCI sent from the relay UE to the DST UE paired with the SRC UE over a time period. The higher the number of HARQ retransmissions and/or CSI requests the worse the CSI.

The SRC UE may determine to perform flow control for ingress data sent from the SRC UE to the relay UE to be relayed to the DST UE paired with the SRC UE.

The SRC UE may determine to abstain from performing flow control for ingress data sent from the DST UE paired with the SRC UE to the relay UE to be relayed to the SRC UE. The SRC UE may send an indication to the DST UE to abstain from performing flow control for ingress data sent from the DST UE paired with the SRC UE to the relay UE to be relayed to the SRC UE. The DST UE may abstain from performing flow control for ingress data sent from the DST UE paired with the SRC UE to the relay UE to be relayed to the SRC UE.

Alternatively, the DST UE may autonomously determine to abstain from performing flow control for ingress data sent from the DST UE paired with the SRC UE to the relay UE to be relayed to the SRC UE based on the SCI sent from the relay UE to the SRC UE.

Conversely, when the relay UE is nearer the DST UE paired with the SRC UE (i.e. in the third scenario), the relay UE may send the SCI to the DST UE paired with the SRC UE with a reduced transmission power. The relay UE may send the SCI to the SRC UE with an increased transmission power.

The SRC UE may not be able to receive (i.e. decode) the SCI sent from the relay UE to the DST UE or may be able to receive the SCI sent from the relay UE to the DST UE with a received signal quality or signal power lower than a threshold. This may indicate that channel conditions between the relay UE and the DST UE paired with the SRC UE are better than channel conditions between the relay UE and the SRC UE. This may indicate that no bottleneck is formed at the relay UE for egress data sent from the relay UE to the DST UE paired with the SRC UE. This may indicate that a bottleneck is formed at the relay UE for egress data sent from the relay UE to the SRC UE. Thus, there may be no need for the SRC UE to perform flow control for ingress data sent from the SRC UE to the relay UE to be relayed to the DST UE paired with the SRC UE in this case.

The SRC UE may determine to abstain from performing flow control for ingress data sent from the SRC UE to the relay UE to be relayed to the DST UE paired with the SRC UE.

The SRC UE may determine to perform flow control for ingress data sent from the DST UE paired with the SRC UE to the relay UE to be relayed to the SRC UE. The SRC UE may send an indication to the DST UE to perform flow control for ingress data sent from the DST UE paired with the SRC UE to the relay UE to be relayed to the SRC UE. The DST UE may perform flow control for ingress data sent from the DST UE paired with the SRC UE to the relay UE to be relayed to the SRC UE.

Alternatively, the DST UE may autonomously determine to perform flow control for ingress data sent from the DST UE paired with the SRC UE to the relay UE to be relayed to the SRC UE based on the SCI sent from the relay UE to the SRC UE.

In a scenario, the SRC UE may perform indirect SL communications with multiple DST UEs via the same relay UE. The SRC UE may perform flow control for ingress data sent from the SRC UE to the relay UE to be relayed to the DST UEs paired with the SRC UE for each DST UE independently. The SRC UE may determine differences in egress data sent from the relay UE to the multiple DST UEs paired with the SRC UE. For example, the SRC UE may determine that egress data sent from the relay UE to a first DST UE paired with the SRC UE is greater than egress data sent from the relay UE to a second DST UE paired with the SRC UE. The SRC UE may determine that ingress data sent from the SRC UE to the relay UE to be relayed to the first DST UE paired with the SRC UE is smaller than ingress data sent from the SRC UE to the relay UE to be relayed to the second DST UE. This may imply that channel conditions between the relay UE and the first DST UE paired with the SRC UE are better than channel conditions between the relay UE and the second DST UE paired with the SRC UE. As a result, the SRC UE may prioritize ingress data sent from the SRC UE to the relay UE to be relayed to the first DST UE paired with the SRC UE over ingress data sent from the SRC UE to the relay UE to be relayed to the second DST UE. Alternatively, the SRC UE may send a relay UE reselection request to the second DST UE paired with the SRC UE.

In a scenario, the SRC UE may perform indirect SL communications with a DST UE paired with the SRC UE via multiple relay UEs (i.e. the SRC UE uses multi-path indirect SL communications as opposed to single path indirect SL communications). The SRC may perform flow control for ingress data sent from the SRC UE to the multiple relay UEs for each relay UE independently. The SRC UE may dynamically how to split ingress data to the multiple relay UEs. The SRC UE may dynamically determine the amount of ingress data sent to each relay UE.

In a scenario, the SRC UE may receive a flow control command from the relay UE and may perform flow control for ingress data sent from the SRC UE to the relay UE to be relayed to the DST UE paired with the SRC UE based thereon. For example, the flow control command may instruct the SRC UE to suspend or resume flow control for all ingress data sent from the SRC UE to the relay UE to be relayed to the DST UE paired with the SRC UE, for ingress data sent from the SRC UE to the relay UE to be relayed to the DST UE paired with the SRC UE with a specific priority class or for ingress data sent from the SRC UE to the relay UE to be relayed to the DST UE paired with the SRC UE with a specific DST UE paired with the SRC UE. The flow control command may be implemented using a SL MAC CE or a SL RRC signalling. The SRC UE may perform flow control for ingress data sent from the SRC UE to the relay UE to be relayed to the DST UE paired with the SRC UE proactively to avoid or reduce signalling overhead caused by frequent transmissions of a flow control command from the relay UE.

One or more aspects if this disclosure may be advantageous in that performance (including relay UE reselection) may be improved without or with minimum standardization. Even in case standardization is required, for example for receiving a flow control command from the relay UE, flow control for ingress data sent from the SRC UE to the relay UE to be relayed to the DST UE paired with the SRC UE proactively to avoid or reduce signalling overhead caused by frequent transmissions of a flow control command from the relay UE as explained above.

One or more aspects if this disclosure may be advantageous in that memory need to buffer egress data at the relay UE may be reduced.

Figure 8:
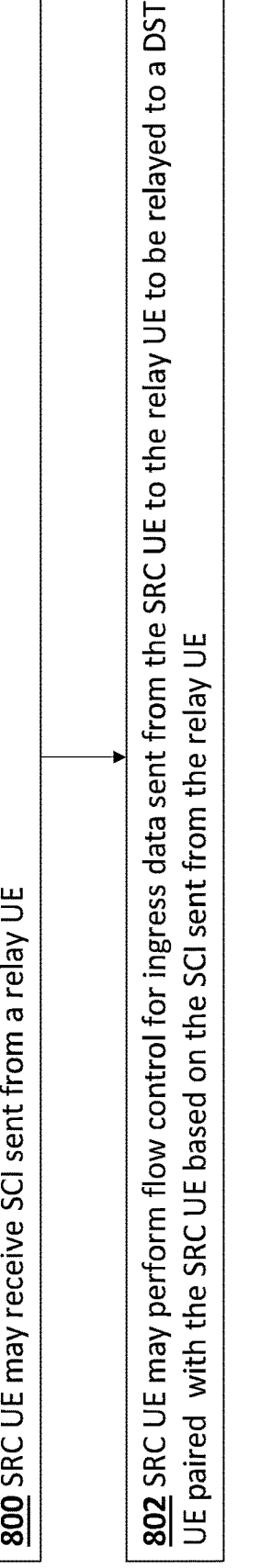
FIG. 8 shows a block diagram of a method for determining how to perform flow control for ingress data sent from a source user equipment to a relay user equipment to be relayed to a destination user equipment paired with the source user equipment.

FIG. 8 shows a block diagram of a method for determining how to perform flow control for ingress data sent from a SRC UE to a relay UE to be relayed to DST UE paired with the SRC UE. The method may be performed by the SRC UE.

In step 800, a SRC UE may receive SCI sent from a relay UE.

In step 802, the SRC UE may perform flow control for ingress data sent from the SRC UE to the relay UE to be relayed to a DST UE paired with the SRC UE based on the SCI sent from the relay UE.

The SCI sent from the relay UE may comprise at least one of: SCI sent from the relay UE to the SRC UE; SCI sent from the relay UE to the DST UE paired with the SRC UE; or SCI sent from the relay UE to another DST UE not paired with the SRC UE.

Performing flow control for the ingress data sent from the SRC UE to the relay UE to be relayed to the DST UE paired with the SRC UE may comprise: reducing some or all of the ingress data sent from the SRC UE to the relay UE to be relayed to the DST UE paired with the SRC UE; or stopping some or all of the ingress data from being sent from the SRC UE to the relay UE to be relayed to the DST UE paired with the SRC UE.

Performing flow control for the ingress data sent from the SRC UE to the relay UE to be relayed to the DST UE paired with the SRC UE may comprise:

determining an amount of ingress data previously sent from the SRC UE to the relay UE to be relayed to the DST UE paired with the SRC UE and buffered by the relay UE based on the SCI sent from the relay UE; and performing flow control for ingress data subsequently sent from the SRC UE to the relay UE to be relayed to the DST UE paired with the SCR UE based on the determining.

The SRC UE may determine an amount of ingress data previously sent from the SRC UE to the relay UE to be relayed to the DST UE paired with the SRC UE and buffered by the relay UE based on the SCI sent from the relay UE per a specific priority class or per all priority classes.

The SRC UE may determine an amount of ingress data previously sent from the SRC UEs to the relay UE to be relayed to the DST UE paired with the SRC UE and buffered by the relay UE further per a specific priority class based on a mapping between a priority class of ingress data previously sent from the SRC UE to the relay UE to be relayed to the DST UE paired with the SRC UE and a priority class of egress data sent from the relay UE and the DST UE paired with the SRC UE.

The SRC UE may determine that an amount B of ingress data of a specific priority class or of all priority classes previously sent from the SRC UE to the relay UE to be relayed to the DST UE paired with the SRC UE and buffered by the relay UE is greater than a first threshold B1 over a first period of time T1 based on the SCI sent from the relay UE. The SRC UE may reduce an amount of ingress data of a priority class lower than a determined priority class p subsequently sent from the SRC UE to the relay UE to be relayed to the DST UE paired with the SRC UE.

The determined priority class p may be a specific priority class of the ingress data when the amount of ingress data of a specific priority class has been determined. The determined priority class p may be a representative priority class derived from all priority classes when the amount of ingress data of all priority classes has been determined.

The SRC UE may determine that the amount B of ingress data of a specific priority class or of all priority classes previously sent from the SRC UE to the relay UE to be relayed to the DST UE paired with the SRC UE and buffered by the relay UE is greater than a second threshold B2 over a second period of time T2 based on the SCI sent from the relay UE. The second threshold B2 may be smaller than the first threshold B1. The second period of time T2 may be greater than the first period of time T1. The SRC UE may stop ingress data of a priority class lower than the determined priority class p from being subsequently sent from the SRCU to the relay UE to be relayed to the DST UE paired with the SRC UE and/or reducing an amount of ingress data of a priority class equal to the determined priority class p subsequently sent from the SRC UE to the relay UE to be relayed to the DST UE paired with the SRC UE.

The SRC UE may determine that the amount B of ingress data of a specific priority class or of all priority classes previously sent from the SRC UE to the relay UE to be relayed to the DST UE paired with the SRC UE and buffered by the relay UE is greater than a third threshold B3 over a third period of time T3 based on the SCI sent from the relay UE. The third threshold B3 may be smaller than the second threshold B2. The third period of time T3 may be greater than the second period of time T2. The SRC UE may send UE assistance information to the relay UE, may send UE assistance information to the DST UE paired with the SRC UE and/or may send a relay UE reselection request to the DST UE paired with the SRC UE.

Multiple DST UEs may be paired with the SRC UE via the relay UE.

The SRC UE may determine an amount of ingress data previously sent from the SRC UE to the relay UE to be relayed to the DST UE paired with the SRC UE and buffered by the relay UE per DST UE paired with the SRC UE based on the SCI sent from the relay UE.

Determining an amount of ingress data previously sent from the SRC UE to the relay UE to be relayed to the DST UE paired with the SRC UE and buffered by the relay UE based on the SCI sent from the relay UE may comprise: determining an amount of ingress data previously sent from the SRC UE to the relay UE to be relayed to the DST UE paired with the SRC UE; determining an amount of egress data previously sent from the relay UE to the DST UE paired with the SRC UE based on the SCI sent from the relay UE; and determining a difference between the amount of ingress data previously sent from the SRC UE to the relay UE to be relayed to the DST UE paired with the SRC UE and the amount of egress data previously sent from the relay UE to the DST UE paired with the SRC UE.

Determining the amount of ingress data previously sent from the SRC UE to the relay UE to be relayed to the DST UE paired with the SRC UE and buffered by the relay UE may be further based on at least one of: a load at the relay UE; a priority policy at the relay UE; or channel conditions between the relay UE and the DST UE paired with the SRC UE.

Figure 9:
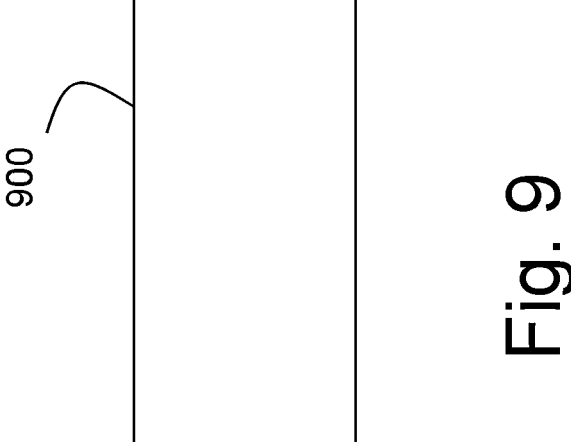
FIG. 9 shows a schematic representation of a non-volatile memory medium storing instructions which when executed by a processor allow a processor to perform one or more of the steps of the method of FIG. 8.

FIG. 9 shows a schematic representation of non-volatile memory media 900 storing instructions and/or parameters which when executed by a processor allow the processor to perform one or more of the steps of the methods of FIG. 8.

It is noted that while the above describes example embodiments, there are several variations and modifications which may be made to the disclosed solution without departing from the scope of the present invention.

It will be understood that although the above concepts have been discussed in the context of a 5GS, one or more of these concepts may be applied to other cellular systems.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIG. 8, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus comprising at least one processor and at least one memory storing instructions that, when executed by the at least one processor, cause the apparatus at least to:

receive sidelink control information sent from a relay user equipment to a destination user equipment paired with the apparatus; and perform flow control for ingress data sent from the apparatus to the relay user equipment to be relayed to the destination user equipment paired with the apparatus based on the sidelink control information sent from the relay user equipment to the destination user equipment paired with the apparatus;

wherein performing flow control for the ingress data sent from the apparatus to the relay user equipment to be relayed to the destination user equipment paired with the apparatus comprises:

determining an amount of ingress data previously sent from the apparatus to the relay user equipment to be relayed to the destination user equipment paired with the apparatus and buffered by the relay user equipment based on the sidelink control information sent from the relay user equipment; and performing flow control for ingress data subsequently sent from the apparatus to the relay user equipment to be relayed to the destination user equipment paired with the apparatus based on the determining.

2. The apparatus of claim 1, wherein performing flow control for the ingress data sent from the apparatus to the relay user equipment to be relayed to the destination user equipment paired with the apparatus comprises:

reducing some or all of the ingress data sent from the apparatus to the relay user equipment to be relayed to the destination user equipment paired with the apparatus; or stopping some or all of the ingress data from being sent from the apparatus to the relay user equipment to be relayed to the destination user equipment paired with the apparatus.

3. The apparatus of claim 1, comprising at least one processor and at least one memory storing instructions that, when executed by the at least one processor, cause the apparatus at least to:

determine an amount of ingress data previously sent from the apparatus to the relay user equipment to be relayed to the destination user equipment paired with the apparatus and buffered by the relay user equipment based on the sidelink control information sent from the relay user equipment per a specific priority class or per all priority classes.

4. The apparatus of claim 3, wherein determining an amount of ingress data previously sent from the apparatus to the relay user equipment to be relayed to the destination user equipment paired with the apparatus and buffered by the relay user equipment based on the sidelink control information sent from the relay user equipment comprises:

determining an amount of ingress data previously sent from the apparatus to the relay user equipment to be relayed to the destination user equipment paired with the apparatus;

determining an amount of egress data previously sent from the relay user equipment to the destination user equipment paired with the apparatus based on the sidelink control information sent from the relay user equipment; and determining a difference between the amount of ingress data previously sent from the apparatus to the relay user equipment to be relayed to the destination user equipment paired with the apparatus and the amount of egress data previously sent from the relay user equipment to the destination user equipment paired with the apparatus.

5. The apparatus of claim 3, wherein determining the amount of ingress data previously sent from the apparatus to the relay user equipment to be relayed to the destination user equipment paired with the apparatus and buffered by the relay user equipment is further based on at least one of:

a load at the relay user equipment;

a priority policy at the relay user equipment; or channel conditions between the relay user equipment and the destination user equipment paired with the apparatus.

6. The apparatus of claim 1, comprising at least one processor and at least one memory storing instructions that, when executed by the at least one processor, cause the apparatus at least to:

determine an amount of ingress data previously sent from the apparatus to the relay user equipment to be relayed to the destination user equipment paired with the apparatus and buffered by the relay user equipment further per a specific priority class based on a mapping between a priority class of ingress data previously sent from the apparatus to the relay user equipment to be relayed to the destination user equipment paired with the apparatus and a priority class of egress data sent from the relay user equipment and the destination user equipment paired with the apparatus.

7. The apparatus of claim 6, comprising at least one processor and at least one memory storing instructions that, when executed by the at least one processor, cause the apparatus at least to:

determine that an amount B of ingress data of a specific priority class or of all priority classes previously sent from the apparatus to the relay user equipment to be relayed to the destination user equipment paired with the apparatus and buffered by the relay user equipment is greater than a first threshold B1 over a first period of time T1 based on sidelink control information sent from the relay user equipment; and reduce an amount of ingress data of a priority class lower than a determined priority class p subsequently sent from the apparatus to the relay user equipment to be relayed to the destination user equipment paired with the apparatus.

8. The apparatus of claim 7, wherein the determined priority class p is a specific priority class of the ingress data when the amount of ingress data of a specific priority class has been determined; or wherein the determined priority class p is a representative priority class derived from all priority classes when the amount of ingress data of all priority classes has been determined.

9. The apparatus of claim 7, comprising at least one processor and at least one memory storing instructions that, when executed by the at least one processor, cause the apparatus at least to:

determine that the amount B of ingress data of a specific priority class or of all priority classes previously sent from the apparatus to the relay user equipment to be relayed to the destination user equipment paired with the apparatus and buffered by the relay user equipment is greater than a second threshold B2 over a second period of time T2 based on the sidelink control information sent from the relay user equipment, wherein the second threshold B2 is smaller than the first threshold B1, wherein the second period of time T2 is greater than the first period of time T1; and stop ingress data of a priority class lower than the determined priority class p from being subsequently sent from the apparatus to the relay user equipment to be relayed to the destination user equipment paired with the apparatus and/or reducing an amount of ingress data of a priority class equal to the determined priority class p subsequently sent from the apparatus to the relay user equipment to be relayed to the destination user equipment paired with the apparatus.

10. The apparatus of claim 9, comprising at least one processor and at least one memory storing instructions that, when executed by the at least one processor, cause the apparatus at least to:

determine that the amount B of ingress data of a specific priority class or of all priority classes previously sent from the apparatus to the relay user equipment to be relayed to the destination user equipment paired with the apparatus and buffered by the relay user equipment is greater than a third threshold B3 over a third period of time T3 based on the sidelink control information sent from the relay user equipment, wherein the third threshold B3 is smaller than the second threshold B2, wherein the third period of time T3 is greater than the second period of time T2; and send user equipment assistance information to the relay user equipment, sending user equipment assistance information to the destination user equipment paired with the apparatus and/or send a relay user equipment reselection request to the destination user equipment paired with the apparatus.

11. The apparatus of claim 1, wherein multiple destination user equipment are paired with the apparatus via the relay user equipment.

12. The apparatus of claim 11, comprising at least one processor and at least one memory storing instructions that, when executed by the at least one processor, cause the apparatus at least to:

determine an amount of ingress data previously sent from the apparatus to the relay user equipment to be relayed to the destination user equipment paired with the apparatus and buffered by the relay user equipment per destination user equipment paired with the apparatus based on the sidelink control information sent from the relay user equipment.

13. A method comprising:

receiving sidelink control information sent from a relay user equipment to a destination user equipment paired with the apparatus; and performing flow control for ingress data sent from the apparatus to the relay user equipment to be relayed to the destination user equipment paired with the apparatus based on the sidelink control information sent from the relay user equipment to the destination user equipment paired with the apparatus;

wherein performing flow control for the ingress data sent from the apparatus to the relay user equipment to be relayed to the destination user equipment paired with the apparatus comprises:

determining an amount of ingress data previously sent from the apparatus to the relay user equipment to be relayed to the destination user equipment paired with the apparatus and buffered by the relay user equipment based on the sidelink control information sent from the relay user equipment; and performing flow control for ingress data subsequently sent from the apparatus to the relay user equipment to be relayed to the destination user equipment paired with the apparatus based on the determining.

14. A method according to claim 13, wherein performing flow control for the ingress data sent from the apparatus to the relay user equipment to be relayed to the destination user equipment paired with the apparatus comprises:

reducing some or all of the ingress data sent from the apparatus to the relay user equipment to be relayed to the destination user equipment paired with the apparatus; or stopping some or all of the ingress data from being sent from the apparatus to the relay user equipment to be relayed to the destination user equipment paired with the apparatus.

15. The method of claim 13, comprising:

determining an amount of ingress data previously sent from the apparatus to the relay user equipment to be relayed to the destination user equipment paired with the apparatus and buffered by the relay user equipment based on the sidelink control information sent from the relay user equipment per a specific priority class or per all priority classes.

16. The method of claim 13, comprising:

determining an amount of ingress data previously sent from the apparatus to the relay user equipment to be relayed to the destination user equipment paired with the apparatus and buffered by the relay user equipment further per a specific priority class based on a mapping between a priority class of ingress data previously sent from the apparatus to the relay user equipment to be relayed to the destination user equipment paired with the apparatus and a priority class of egress data sent from the relay user equipment and the destination user equipment paired with the apparatus.

17. The method of claim 16, comprising:

determining that an amount B of ingress data of a specific priority class or of all priority classes previously sent from the apparatus to the relay user equipment to be relayed to the destination user equipment paired with the apparatus and buffered by the relay user equipment is greater than a first threshold B1 over a first period of time T1 based on sidelink control information sent from the relay user equipment; and reducing an amount of ingress data of a priority class lower than a determined priority class p subsequently sent from the apparatus to the relay user equipment to be relayed to the destination user equipment paired with the apparatus.

18. A non-transitory computer readable medium comprising program instructions stored thereon for performing:

receiving sidelink control information sent from a relay user equipment to a destination user equipment paired with an apparatus; and performing flow control for ingress data sent from the apparatus to the relay user equipment to be relayed to the destination user equipment paired with the apparatus based on the sidelink control information sent from the relay user equipment to the destination user equipment paired with the apparatus;

wherein performing flow control for the ingress data sent from the apparatus to the relay user equipment to be relayed to the destination user equipment paired with the apparatus comprises:

determining an amount of ingress data previously sent from the apparatus to the relay user equipment to be relayed to the destination user equipment paired with the apparatus and buffered by the relay user equipment based on the sidelink control information sent from the relay user equipment; and performing flow control for ingress data subsequently sent from the apparatus to the relay user equipment to be relayed to the destination user equipment paired with the apparatus based on the determining.

\* \* \* \* \*